(12) United States Patent
Dong et al.

(10) Patent No.: US 11,522,487 B2
(45) Date of Patent: Dec. 6, 2022

(54) BUILDING AND BUILDING CLUSTER ENERGY MANAGEMENT AND OPTIMIZATION SYSTEM AND METHOD

(71) Applicant: BOARD OF REGENTS, THE UNIVERSITY OF TEXAS SYSTEM, Austin, TX (US)

(72) Inventors: Bing Dong, Helotes, TX (US); Zhaoxuan Li, San Antonio, TX (US); Jeff Qiang Xu, San Antonio, TX (US)

(73) Assignee: BOARDS OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 588 days.

(21) Appl. No.: 16/486,951

(22) PCT Filed: Feb. 22, 2018

(86) PCT No.: PCT/US2018/019131
§ 371 (c)(1),
(2) Date: Aug. 19, 2019

(87) PCT Pub. No.: WO2018/156700
PCT Pub. Date: Aug. 30, 2018

(65) Prior Publication Data
US 2020/0059098 A1 Feb. 20, 2020

Related U.S. Application Data

(60) Provisional application No. 62/461,967, filed on Feb. 22, 2017.

(51) Int. Cl.
*H02S 10/10* (2014.01)
*H02J 3/00* (2006.01)
(Continued)

(52) U.S. Cl.
CPC ............. *H02S 10/10* (2014.12); *G06Q 50/06* (2013.01); *H02J 3/003* (2020.01); *H02J 3/004* (2020.01);
(Continued)

(58) Field of Classification Search
CPC .... H02J 3/32; H02J 3/383; H02J 3/386; H02J 13/0006; H02J 3/003; H02J 2203/20;
(Continued)

(56) References Cited

U.S. PATENT DOCUMENTS

2008/0072182 A1* 3/2008 He ...................... G06F 30/3323
703/2
2010/0324962 A1* 12/2010 Nesler ...................... G05F 1/66
705/412
(Continued)

*Primary Examiner* — Ziaul Karim
(74) *Attorney, Agent, or Firm* — Thomas Horstemeyer, LLP

(57) ABSTRACT

Disclosed are various embodiments for optimizing energy management. A quantity of renewable power that will be generated by renewable energy generation sources can be forecasted. The energy demand for a building or a cluster of buildings can be forecasted. A pricing model for buying energy from a grid can be determined. A quantity of energy to import from the grid or export to the grid can be scheduled based on the quantity of renewable energy forecasted and the state of charge or health of battery energy storage system, current and future operations of building HVAC, lighting and plug loads system, the forecasted energy demand for the building, and the pricing of the energy from the grid.

20 Claims, 13 Drawing Sheets

(51) Int. Cl.
  *G06Q 50/06* (2012.01)
  *H02J 3/32* (2006.01)
  *H02J 3/14* (2006.01)
  *H02J 13/00* (2006.01)
  *H02J 3/38* (2006.01)

(52) U.S. Cl.
  CPC .............. *H02J 3/14* (2013.01); *H02J 3/144* (2020.01); *H02J 3/32* (2013.01); *H02J 3/381* (2013.01); *H02J 13/00* (2013.01); *H02J 13/00004* (2020.01); *H02J 2203/20* (2020.01); *H02J 2300/20* (2020.01); *H02J 2310/64* (2020.01)

(58) Field of Classification Search
  CPC ........ H02J 2310/64; H02J 3/144; H02J 13/00; H02J 3/004; H02J 3/14; H02J 13/00004; H02J 3/381; H02J 2300/20; H02J 2310/12; H02J 2310/14; H02J 7/34; G06Q 50/06; G06Q 10/04; G06Q 10/063; G06Q 30/02; Y02B 10/10; Y02B 70/30; Y02B 90/20; Y02B 70/3225; Y02E 10/76; Y02E 10/56; Y02E 40/10; Y02E 70/30; Y04S 20/12; Y04S 20/242; Y04S 20/244; Y04S 50/10; Y04S 20/222; Y04S 50/14; H02S 10/20; H02S 10/10
  See application file for complete search history.

(56) References Cited

U.S. PATENT DOCUMENTS

| | | | |
|---|---|---|---|
| 2011/0047418 A1* | 2/2011 | Drees | G05B 23/00 714/57 |
| 2011/0061015 A1* | 3/2011 | Drees | G05B 15/02 700/275 |
| 2011/0178977 A1* | 7/2011 | Drees | H02J 13/00002 706/52 |
| 2014/0000836 A1* | 1/2014 | Xu | F24F 11/62 165/11.1 |
| 2014/0025351 A1* | 1/2014 | Ghosh | G06F 17/10 703/2 |
| 2015/0333512 A1* | 11/2015 | Saussele | H02J 9/065 700/287 |
| 2016/0305678 A1* | 10/2016 | Pavlovski | F24F 11/62 |

* cited by examiner

BUILDING AND BUILDING CLUSTER ENERGY MANAGEMENT AND OPTIMIZATION SYSTEM AND METHOD

CROSS-REFERENCE TO RELATED APPLICATIONS

This application claims priority to and the benefit of PCT Application PCT/US2018019131 entitled "Building and Building Cluster Energy Management and Optimization," filed on Feb. 22, 2018, and this application also claims priority to and the benefit of U.S. Provisional Application No. 62/461,967 entitled "Building and Building Cluster Energy Management and Optimization System and Method," filed Feb. 22, 2017, all of which are hereby incorporated herein by reference in their entireties.

BACKGROUND

Buildings account for more than 40% of the total energy demand in the U.S., resulting in an annual national energy bill totaling more than $430 billion according to a Multiple Year Program Plan from Building Technologies Office in the U.S. Department of Energy (DOE). With the increasing penetration of distributed energy resources (DERs) or devices such as solar energy or photovoltaic (PV) systems, wind turbine energy generation, distributed fossil fuel powered generators, fuel cells, electric vehicles (EVs), and battery energy storage systems (BESS) at the individual building and microgrid level, electrical load patterns can become uncertain and variable. This uncertainty and variability can contribute to grid instability and energy waste. At the grid level, the introduction of renewable energy can also make the power system status more uncertain and variable, which requires more ancillary services to ensure system supply adequacy and reliability. Thus, the need for ancillary service provisions will increase substantially, and utility will require more flexible loads.

SUMMARY

A system can include a data store and at least one computing device in communication with the data store. The computing device can be configured to forecast a quantity of renewable power from a plurality of renewable energy generation sources. The computing device can be configured to forecast an energy demand for at least one building. The computing device can be configured to determine the state of charge and state of health of battery energy storage system. The computing device can be configured to determine pricing for energy on a grid. The computing device can be configured to schedule a quantity of energy to import to the grid or export from the grid based at least in part on the forecasted quantity of renewable power, the forecasted energy demand, and the real-time pricing for energy on the grid.

The computing device can be configured to determine at least one weather forecast for at least one local area corresponding to at least one of the plurality of renewable energy generation sources. The forecasted quantity of renewable power can be based at least in part on the at least one weather forecast. The computing device can be configured to determine at least one weather forecast for at least one local area corresponding to the at least one building. The forecasted energy demand can be based at least in part on the at least one weather forecast.

A communication bus can provide communication among the computing device, a battery management service, a grid management service, a building energy usage service, and a power generation service. The computing device can be configured to obtain a state of charge for a battery energy storage system. The computing device can be configured to obtain a state of health for the battery energy storage system. The quantity of energy scheduled to import to the grid or export from the grid can be based at least in part on the state of charge and the state of health of battery energy storage system.

The at least one building can include a plurality of buildings. The battery energy storage system can refer to a plurality of battery energy storages. Each of the battery energy storages can be located at a different building. The computing device can be configured to optimize a scheduling of charging and discharging for the battery energy storage based at least in part on the forecasted quantity of renewable power, the forecasted energy demand, and the real-time pricing for energy on the grid.

The computing device can be configured to predict an occupancy of the at least one building. The forecasted energy demand for the at least one building can be based at least in part on the occupancy of the at least one building. The energy demand can be forecasted using sample average approximation stochastic programming. The energy demand can be forecasted based at least in part on a reduced order thermal resistance and capacitance network model.

A method can include forecasting a quantity of renewable power from a plurality of renewable energy generation sources. The method can include forecasting an energy demand for at least one building. The method can include determining the state of charge and the state of health of battery energy storage system. The method can include determining pricing for energy on a grid. The method can include scheduling a quantity of energy to import to the grid or export from the grid based at least in part on the forecasted quantity of renewable power, the forecasted energy demand, and the real-time pricing for energy on the grid.

The method can include determining at least one weather forecast for at least one local area corresponding to at least one of the plurality of renewable energy generation sources. The forecasted quantity of renewable power can be based at least in part on the at least one weather forecast. The method can include determining at least one weather forecast for at least one local area corresponding to the at least one building. The forecasted energy demand can be based at least in part on the at least one weather forecast.

The pricing for energy on the grid can be determined using a dynamic real-time pricing. The method can include coupling a battery management service, a grid management service, a building energy usage service, and a power generation service in communication with one another. The method can include obtaining a state of health for the battery energy storage system based at least in part on a chemical composition of an anode, a cathode, and an electrolyte. The quantity of energy scheduled to import to the grid or export from the grid is further based at least in part on the state of charge and the state of health.

The method can include optimizing a scheduling of charging and discharging for the battery energy storage system based at least in part on the forecasted quantity of renewable power, the forecasted energy demand, and the real-time pricing for energy on the grid. The method can include predicting an occupancy of the at least one building. The forecasted energy demand for the at least one building can be based at least in part on the occupancy of the at least one building. The energy demand can be forecasted using sample average approximation stochastic programming. The energy demand can be forecasted based at least in part on a reduced order thermal resistance and capacitance network model.

These and other aspects, objects, features, and embodiments will become apparent to a person of ordinary skill in the art upon consideration of the following detailed description of illustrative embodiments exemplifying the best mode as presently perceived.

BRIEF DESCRIPTION OF THE DRAWINGS

For a more complete understanding of the embodiments and the advantages thereof, reference is now made to the following description, in conjunction with the accompanying figures briefly described as follows.

Figure 1:
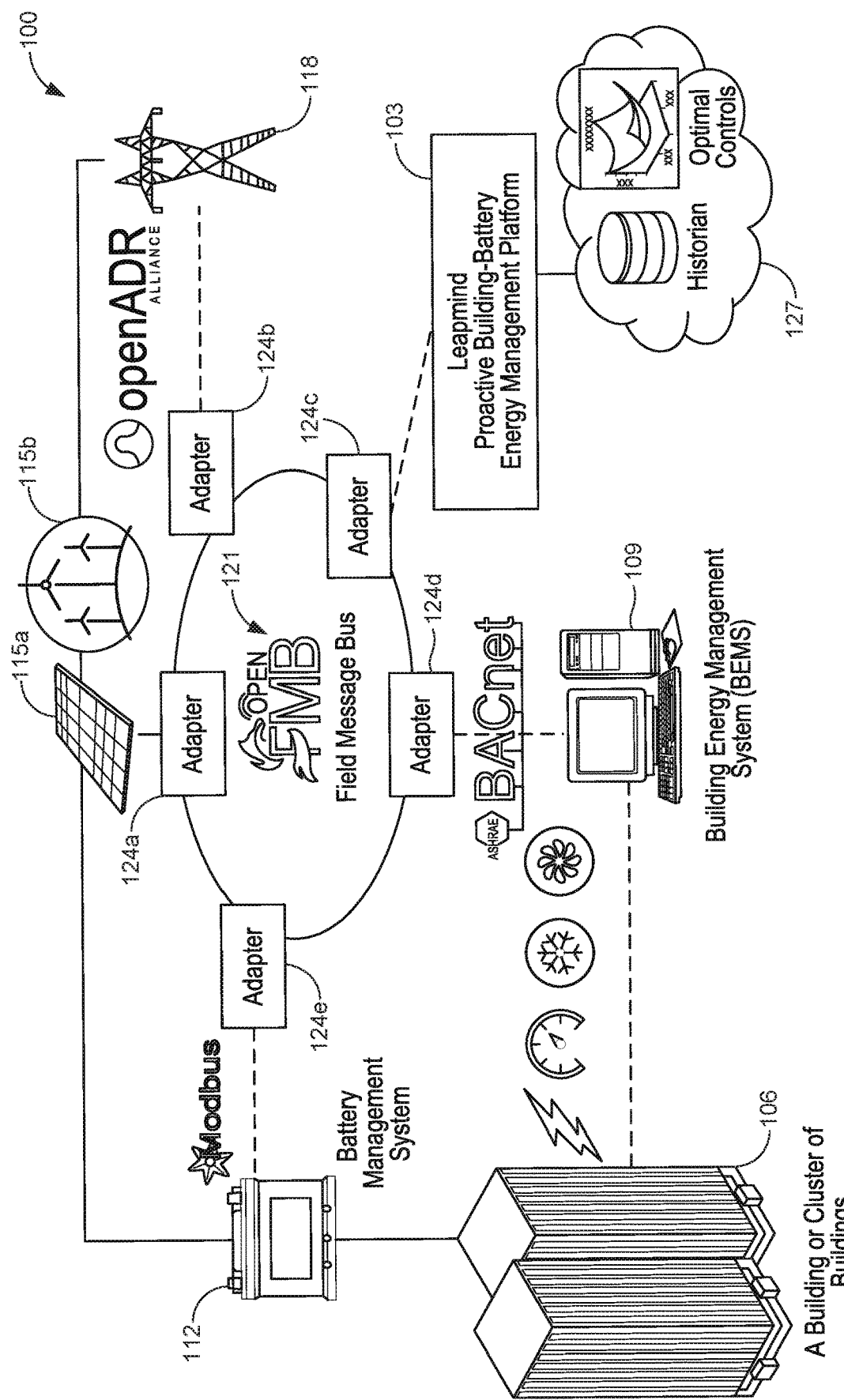
FIG. 1 is a drawing of a networked environment according to various embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments of the disclosure described herein and any equivalents. Furthermore, reference to various feature(s) of the "present disclosure" is not to suggest that all embodiments must include the referenced feature(s).

Among embodiments, some aspects of the present disclosure are implemented by a computer program executed by one or more processors, as described and illustrated. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

This application relates to an energy management and optimization system and method of a building and/or a cluster of buildings and/or a microgrid. A demand response program can be used to address energy management and optimization; however, the demand response program can be disconnected from the needs of building loads. The benefits of battery energy storage system for buildings are largely underestimated. The underestimation can be contributed to 1) a lack of technical understanding and communication architecture from grid to battery energy storage system and building management system, 2) an uncertainty in any load and renewable energy production forecasting, 3) an unpredictability of battery energy storage system degradation pattern, cycle/operation and calendar life, battery state of charge (SOC) and state of health (SOH), and potential safety concerns, specifically to lithium-ion batteries, and 4) a lack of integrated control of battery energy storage system and flexible building loads such as HVAC, lighting etc., among other reasons.

With reference to a Navigant Research Report entitled "Energy Storage Software: Aggregation, Asset Management, and Grid Services," the report discusses that the increasing complexity of adding BESS into any projects needs an advanced or innovative software and control platform to optimize the return on investment and enable the BESS to reach its full potential. The report estimates that the BESS control software platform market is growing rapidly with a ~37% compounded annual growth rate (CAGR) worldwide. A microgrid can include a group of interconnected loads and distributed energy resources within clearly defined electrical boundaries that acts as a single controllable entity with respect to the grid. The microgrid can be connected and disconnected from a grid to enable or disable operation in both grid-connected or island mode. A remote microgrid can be a variation of a microgrid that operates in islanded conditions. The systems and methods discussed herein can include the ability to optimize, aggregate, and manage distributed energy resources (DERs) to accomplish the requirements or power flows of a microgrid. Thus, a building or a cluster of buildings can sometime be a microgrid.

Building controls can potentially reduce energy consumption significantly. Supervisory model predictive control (MPC) can be used in buildings to control active ice storage and passive thermal storage systems, maintain indoor thermal comfort, minimize total HVAC energy consumption, control HVAC as well as blind positions and electrical lighting, 5) control building climate within the smart grid context, reduce peak demand, and control HVAC systems based on occupancy behavior used agent-based approach to evaluate the demand response on a cluster of buildings among other uses.

A building energy management system can include smart grid technologies and advanced metering infrastructure. The building energy management system can take real-time electricity prices into consideration and adjust an energy consumption profile to reduce its energy cost by shifting partial of its load from peak time to off peak time. This process can be called price responsive demand. Meanwhile with the advanced control strategies, a building cluster can integrate renewable power and battery energy storage facilities to achieve net-zero target by selling its excessive energy during peak hours back to a grid. With large integration of renewable energy to power systems, ancillary services can be more valuable to ensure power system reliability. A building cluster with renewable power and battery energy storage system may sell ancillary services for an extra revenue source, further reducing the operational cost.

Achieving value-added services can face several challenges. The introduction of additional energy sources, information inputs, and potential revenue sources can create complexity between a building or a building cluster and a grid from both physical and economic perspectives. Specifically, the power supply from a renewable source can be variable and uncertain. This variability and uncertainty can create more challenges on the control of a building cluster and status estimation of the connected distribution grid. Answers to the following questions can help guide the solutions to these problems: What is the scheduling strategy on renewable power dispatch, uncertainty on future building loads and HVAC control for this kind of systems to optimally balance system reliability and cost saving? How a system allocates demand response capacity of the controllable load units (e.g. HVAC) across the cluster and the charging/discharging capacity of a cluster-centralized battery energy storage facility to maximize the total revenue, subject to electricity physical constraints, energy device constraints, user preference, and user case?

The present disclosure considers the following, among other, components: a) nonlinear battery energy storage degradation model, b) intra-hour and day-ahead renewable energy sources forecasting, c) nonlinear HVAC models into the overall strategy of its modeling and energy optimization, and d) integrated model predictive control of all above elements.

With reference to FIG. 1, shown is a networked environment 100 according to various embodiments of the present disclosure. The networked environment 100 can include an energy management and optimization system 103, one or more buildings or clusters of buildings 106, a building energy management system 109, a battery management system 112, one or more power generating devices 115a and 115b, a grid 118, and potentially other components coupled together to a messaging bus 121. One or more adapters 121a-e can be utilized to translate messages between the various components. The optimization system 103 can include a data store 127 including historical information and optimal controls.

The disclosure includes systems and methods to address above-mentioned challenges through the integration of the building energy management system 109, renewable energy generation 115a and 115b, and battery energy storage system (BESS) 112. The networked environment 100 can be based on a predictive control strategy to integrate grid signals, renewable energy generation 115a-b, and building energy management 109, among other components. The disclosed overall architecture can leverage building energy management 109 information, for example, through BACnet™ or connected thermostats. The message bus 121 can be developed using any communication protocol such as an open field message bus based on OpenFMB™. The networked environment can be utilized to optimize total energy use and cost while considering energy device constraints and maintaining grid stability.

The optimization system 103 can be utilized to compute and implement the optimized control strategy by forecasting future states of solar and wind energy generation, forecasting future building or a cluster of buildings 106 flexible load patterns, detecting and forecasting future occupancy status at a room/space, a floor and a building level of the building 106, incorporating local weather forecasting communicating with battery management system 112 to obtain the state of charge (SOC) and the state of health (SOH) of battery energy storage system if available, incorporating battery degradation model (chemistry based), using a dynamic real-time energy pricing strategy from the grid 118, and communicating with each energy devices based on the message bus 121. All above computation can be done by cloud computing, by local computers, by controllers, or another processor.

Thus, the energy management and optimization system 103 can fulfill the following functions: optimize battery energy storage system charge and discharge schedules, avoid early failure of battery energy storage system 112 and unwanted safety problems, improve battery energy storage system 112 life span, predict the schedules for building or a cluster of buildings 106 flexible load, and schedule energy import and export from/to grid, among other functions.

Application of the optimization system 103 can include peak demand and energy reduction for building, behind-meter distributed energy resource management, in-front-of-meter distributed energy resource management, microgrid management for commercial and industrial buildings, ancillary services and frequency regulation, utility-scale microgrid management to balance load, among other capabilities.

Figure 2:
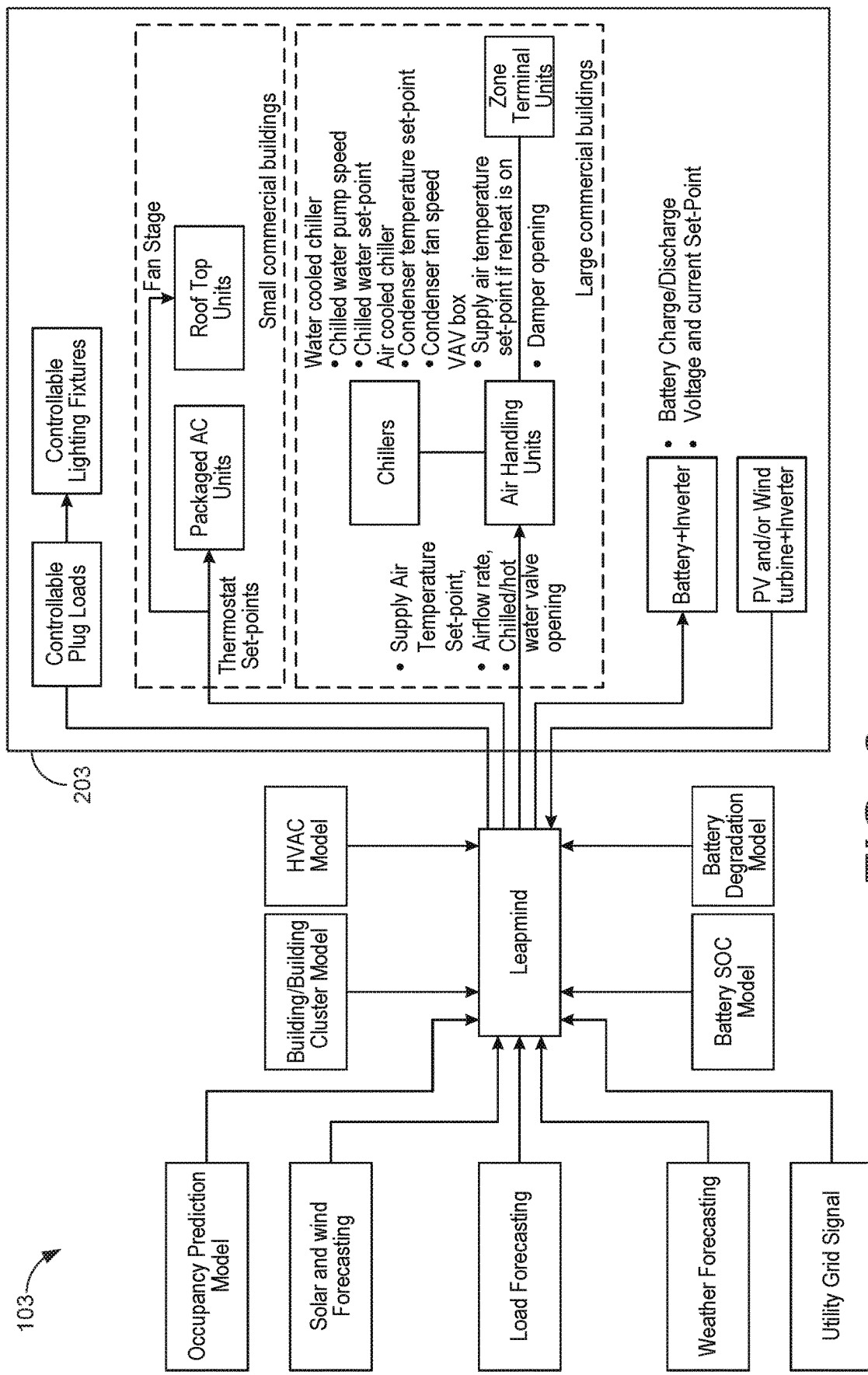
FIG. 2 is an architectural diagram for an example embodiment of an optimization system according to various embodiments of the present disclosure.

With reference to FIG. 2, shown are components of the optimization system 103 according to various embodiments of the present disclosure. The components can include 1) occupancy prediction model from buildings, 2) solar and wind energy forecasting model, 3) building load forecasting model, 4) weather forecasting, 5) utility grid signal, 6) building/building cluster physics-based model, 7) HVAC physics-based model, 8) battery SOC model, and 9) battery degradation model, among other components.

The energy hardware devices 203 can include: 1) roof top units (RTU) for small and medium-sized commercial/industrial buildings, 2) primary and secondary HVAC system including air handing units (AHU), fans, chillers, pumps, and air terminal units for large commercial/industrial buildings, 3) battery energy storage system (BESS), and 4) photovoltaic (PV)/solar panel or wind turbine energy generation, among other devices.

For a single building and a cluster of buildings, the optimization system 103 can make decisions based on battery energy storage constraints. The battery energy storage constraints can include specific battery chemistry types, battery performance characteristics, battery SOC, battery SOC operation window, battery SOH, battery charging and discharging power capabilities or rate capabilities, and available or useable battery energy capacity among other constraints. The optimization system 103 can make decisions based on PV/solar power or wind power generation forecasting among other power forecasting. The optimization system 103 can also make decisions on building load forecasting, building control state estimation, utility requests, and building and utility operational constraints. The optimization system 103 can make decisions on occupants' thermal comfort preferences if in the building load levels and occupants' schedule forecasting if in the building load levels.

The integrated control, energy management and optimization system 103 communicates these constraints, forecasting, preferences, estimation, and requests by dispatching heating, cooling and ventilation set-points and actuator actions to the local device controllers. The optimization system 103 can have decision-making capabilities to control the battery energy storage system over a time horizon. The optimization system 103 can solve the uncertainty and complexity of renewable energy forecasting and building load forecasting.

The optimization formulation can integrate decision-making, forecasting, state estimation, and model prediction by considering moving horizon optimization formulations that also deal with uncertainty in building load and renewable energy generation forecasting by using stochastic programming methods. The system has an optimization engine that computes schedules of building flexible loads and battery energy storage system based on the information it collects. Specifically, based on real-time updated information such as renewable energy and building load forecasting, the optimization engine computes the optimal HVAC system and component level set-points and battery charge and discharge strategies. The control variables include but not limited to, controllable lighting system and loads, controllable plug system and loads, HVAC system, and other systems.

The control variables for buildings including small and medium-sized commercial and industrial buildings, can include zone temperature set-points for packaged air-conditioning units, zone temperature set-points for roof-top units, and fan stage commands for roof-top units. The control variables for buildings including large commercial and industrial buildings, can include supply air temperature set-points for variable air volume terminal box if reheat mode is on, reheat water valve opening for variable air volume terminal box if reheat mode is on, supply air damper opening position for variable air volume terminal box, supply air temperature set-points for Air Handling Units (AHU), supply air flow rate for Air Handling Units (AHU), outdoor air damper opening position for Air Handling Units (AHU), chilled water valve opening position for Air Handling Units (AHU), hot water valve opening position for Air Handling Units (AHU), supply chilled water temperature for water-cooled chiller, supply chilled flow rate for water-cooled chiller, condenser fan speed for air-cooled chiller, and condenser temperature set-points for air-cooled chiller.

The optimization system 103 can include a multi-layer model predictive control architecture, stochastic programming for uncertainty management, and nonlinear programming formulation for detailed equipment models such as battery energy storage degradation model.

With reference to multi-layer model predictive control, the optimization system 103 can employ a fast model predictive control framework. Due to the periodic daily pattern of building electricity load and utility prices, the optimization system 103 can plan n (136) hours ahead, more preferred, n=24 hours, so that the optimization system 103 can provide optimal battery charging and discharging strategies according to the controlled building load and utility energy price patterns. The supervisory control of battery energy storage can require set-points for a well-defined period of time or a battery SOC point during battery charging and/or discharging. These set-points can be checked or corrected as operations progress to preserve the usage life of the battery and avoid unwanted safety problems.

The multi-layer architecture of model predictive control disclosed can be considered for slow and fast dynamics of system level models. On the upper layer, a long-term planning horizon can be employed with a coarse time step, every m (1≤m≤30) minutes planning, more preferred m=15 minutes, for next n (1≤n≤36) hours, more preferred n=24 hours, for planning ahead. On the lower layer, a short-term planning horizon, every $m_{batt}$ minutes planning for next m minutes, can be employed with a fine time step for fast dynamic modeling to control battery charging and discharging activities. In addition, the lower layer can have the constraints to be consistent with upper layer power requirement output. In this way, the optimization system 103 can be able to both plan ahead for a long time period and take into account fast or slow dynamics of the any types of battery energy storage system (BESS) simultaneously. The $m_{batt}$ figures can be subject to battery chemistry types, battery size or available/usable energy capacity, performance characteristics or power capability or rate capability, degradation model or pattern, SOC status, and SOH status.

With reference to stochastic programming for uncertainty management, both building load and renewable energy generation forecasting (solar and/or wind) cannot be predicted with 100% accuracy. The optimization system 103 can adopt a sample average approximation stochastic programming approach to explicitly consider the forecast uncertainty and provide HVAC set-points that balance against various forecast profiles. In this disclosed algorithm, instead of optimizing over one set of future building load and renewable power profiles, the algorithm can optimize over multiple sets of future building loads and renewable power profiles and attempt to compute HVAC set-points that are feasible for all given profiles and minimizes over the average objective values of the profiles.

Specifically, the following mathematical formulation can be used for a single building:

$$(P_s^{from\_grid}, P^{to\_grid}, P^{HVAC}, P^{light}, P^{plug}, P_d^{batt}) = \qquad (1)$$

$$\operatorname{argmin}\left(\frac{1}{N_s}\sum_{s=1}^{N_s} O(L_s)\right)$$

s.t. $g(P^{from\_grid}, P^{to\_grid}, P^{renewables}, P_d^{batt}) = 0$, for $s = 1, 2, \ldots, N_s; i = 1, 2, \ldots, N_i$ where $N_s$ is the number of load profiles in a single building; $P_s^{from\_grid}$ is the power purchased from grid for load scenario s, and the values are scenario-dependent; $L_s$ is the load scenario s, due to the solar forecasting; $O(L_s)$ is the objective function for load scenario s; $P^{from\_grid}$ is the power purchased from grid for building, and the values are scenario-dependent; $P^{to\_grid}$ is the power to the grid from building; $P_d^{batt}$ is discharge power set-point from battery energy storage system; $P^{light}$ is the power usage by lighting system; $P^{plug}$ is the power usage by plug system; $P^{HVAC}$ is the power usage by HVAC system; $P^{renewables}$ is the renewable energy power (such as PV or solar panel, wind turbine, etc.) generated from a building; and $g(P^{from\_grid}, P^{to\_grid}, P^{renewables}, P_d^{batt})$ is functions of model constraints on component dynamics and building load constraints.

For a cluster of buildings:

$$\left(\sum_{l=1}^{N_l} P_{l,s}^{from\_grid}, \sum_{l=1}^{N_l} P_l^{to\_grid}, \sum_{l=1}^{N_l} P_l^{HVAC}, \sum_{l=1}^{N_l} P_l^{light}, \sum_{l=1}^{N_l} P_l^{plug}, P_d^{batt}\right) = \qquad (2)$$

$$\operatorname{argmin}\left(\frac{1}{N_{s,l}} \sum_{l=1}^{N_l} \sum_{s=1}^{N_s} O(L_{l,s})\right)$$

s.t. $g\left(P_l^{from\_grid}, P_l^{to\_grid}, P_l^{renewables}, P_d^{batt}\right) = 0,$ for $j = 1, 2, \ldots, N_l; s = 1, 2, \ldots, N_s$ where $N_l$ is the number of buildings; $N_s$ is the number of load profiles of all buildings; the number of HVAC systems in a building cluster is the same of number of buildings; $L_s$ is the load scenario s, due to the solar forecasting; $O(L_{l,s})$ is the objective function for load scenario s for the building l; $P_l^{from\_grid}$ is the power purchased from grid for building l, and the values are scenario-dependent; $P_l^{to\_grid}$ is the power to the grid from building l; $P_d^{batt}$ is discharge power set-point from battery energy storage system; $P_l^{light}$ is the power usage by lighting system for building l; $P_l^{plug}$ is the power usage by plug system for building l; $P_l^{HVAC}$ is the power usage by HVAC systems for building l; $P_l^{renewables}$ is the renewable energy power (such as PV or solar panel, wind turbine, etc.) generated from building l; and $g(P_l^{from\_grid}, P_l^{to\_grid}, P_l^{renewables}, P_d^{batt})$ is functions of model constraints on component dynamics and load constraints.

A nonlinear programming formulation can be applied to model objective functions and all equipment dynamics in a building or a cluster of buildings 106. The optimization system 103 can minimize the total cost using the objective function. The objective function can includes utility energy costs of selling and buying, utility demand charge cost, and levelized battery operation cost. The levelized battery operation cost can be constrained by battery chemistry types, battery's SOC operation window, battery charging and discharging power or current capabilities, and battery degradation mechanisms or battery life characteristics. The optimization system 103 can utilize the nonlinear programming algorithms to take all of the above battery energy storage constraints, among others, into account to derive the optimized result for a specific user case. The objective function can be the summation of utility cost. The summation of utility cost can include utility energy cost, utility demand charge cost, utility electricity buying cost, and levelized battery operation cost in a building or a cluster of buildings, as well as soft constraints for battery SOC range.

For a single building 106, the problem formulation can be shown as follows:

$$\min\left\{\sum_{t=1}^{n}\left(c^{util}P^{from\_grid}(t) - c^{sell}P^{to\_grid}(t) + \right.\right. \qquad (3)$$
$$\left.\left. c^{batt,op}(t)P_d^{batt}(t) + c^{demand}\max_t(P^{from\_grid}(t))\right)\right\}$$

s.t.

$P^{from\_grid}(t+1) = g(x_t, y_t, u_t, d_t),$ $SOC_{min} \leq SOC \leq SOC_{max}$ $P^{from\_grid} + P_c^{batt} + P_d^{batt} - P^{to\_grid} =$
$\qquad P^{HVAC} + P^{light} + P^{plug} + P^{bldg\_misc}$ $P^{to\_grid} = P_-^{renewable} = P^{renewable} - P_+^{renewable}$ $P_d^{batt} \leq P_{d0}^{batt,max} - P_{loss}^{batt}$ where $x_t$, $u_t$, $d_t$ are state (e.g. zone temperature), control variables as listed in section 3.2 (e.g. air handling unit (AHU) supply air temperature set-points) and disturbances (e.g. internal heat gains from people and equipment) variables in this optimal control for a building; $C^{util}$, $c^{demand}$, $c^{sell}$ and $c^{batt,op}$ are utility electricity charges, utility electricity demand charges, utility electricity buying cost, and levelized battery operation cost, which is total lifetime cost of the battery energy storage system divided by the system's total lifetime battery energy production or energy throughput in Wh as a cost per Wh ($/Wh) at time t. Total lifetime battery energy production or energy throughput is defined as:

$$\sum_{t=1}^{n}(P_d^{batt}(t));$$

$P_{d0}^{batt,max}$ is the battery maximum/peak/allowable discharge power at a fixed SOC point (e.g., 50%, 40%, 30%, 20%, or 10%; generally, 20% is preferred) at the beginning of life (EOL), which can be calculated by various methods during a specifically defined test plan; $P_{loss}^{batt}$ is the battery power loss correlated to $P_{d0}^{batt,max}$ due to battery degradation from operation cycle life and calendar life at time t; $P_-^{renewables}$ is the renewable energy power (such as PV or solar panel, wind turbine, etc.) generated to the grid; $P_+^{renewables}$ is the renewable energy power (such as PV or solar panel, wind turbine, etc.) used by buildings; $P^{bldg\_misc}$ is the power used by buildings except for plug, lighting and HVAC; SOC is the state of charge of battery; and other parameters or symbols are as defined in Equation (1) herein.

For a cluster of buildings 106, the problem formulation can be shown as follows:

$$\min\left\{\sum_{t=1}^{n}\left(c^{util}\sum_{l=1}^{N_l}P_l^{from\_grid}(t) - c^{sell}\sum_{l=1}^{N_l}P_l^{to\_grid}(t)\right) + \right. \qquad (4)$$
$$\left. c^{batt,op}(t)P_d^{batt}(t) + c^{demand}\max_t\left(\sum_{l=1}^{N_l}P_l^{from\_grid}(t)\right)\right\}$$

s.t.

$P_l^{from\_grid}(t+1) = g_l(x_t^l, y_t^l, u_t^l, d_t^l),$ $SOC_{min} \leq SOC \leq SOC_{max}$ -continued $$\sum_{l=1}^{N_l}\left(P_l^{from\_grid} - P_l^{to\_grid}\right) + P_c^{batt} + P_d^{batt} =$$

$$\sum_{l=1}^{N_l}\left(P_l^{HVAC} + P_l^{light} + P_l^{plug} + P_l^{bldg\_misc}\right)$$

$$P_l^{to\_grid} = P_{l-}^{renewable} = P_l^{renewable} - P_{l+}^{renewable}$$

$$P_d^{batt} \le P_{d0}^{batt,max} - P_{loss}^{batt}$$

where $x_t^l$, $u_t^l$, $d_t^l$ are state (e.g. zone temperature), control variables (e.g. AHU supply air temperature set-points) and disturbances (e.g. internal heat gains from people and equipment) for building l at time t; $c_{util}$, $c^{demand}$, $c^{sell}$ and $c^{batt,op}$ are utility electricity charges, utility electricity demand charges, utility electricity buying cost, and levelized battery operation cost at time t, which are defined in above Equation (3); $p_{d0}^{batt,max}$ is the battery maximum/peak/allowable discharge power at a fixed SOC point (e.g., 50%, 40%, 30%, 20%, or 10%; generally, 20% is preferred) at the beginning of life, which can be calculated by various methods during a specifically defined test plan; $P_{loss}^{batt}$ is the battery power loss correlated to $P_{d0}^{batt,max}$ due to battery degradation from operation cycle life and calendar life at time t; $P_{l-}^{renewables}$ is the renewable energy power (such as PV or solar panel, wind turbine, etc.) generated from building/to the grid; $P_{l+}^{renewables}$ is the renewable energy power (such as PV or solar panel, wind turbine, etc.) used by building l; $P_l^{bldg\_misc}$ is the power used by building l except for plug, lighting and HVAC; SOC is the state of charge of battery; and other parameters or symbols are defined in Equation (2).

Figure 3:
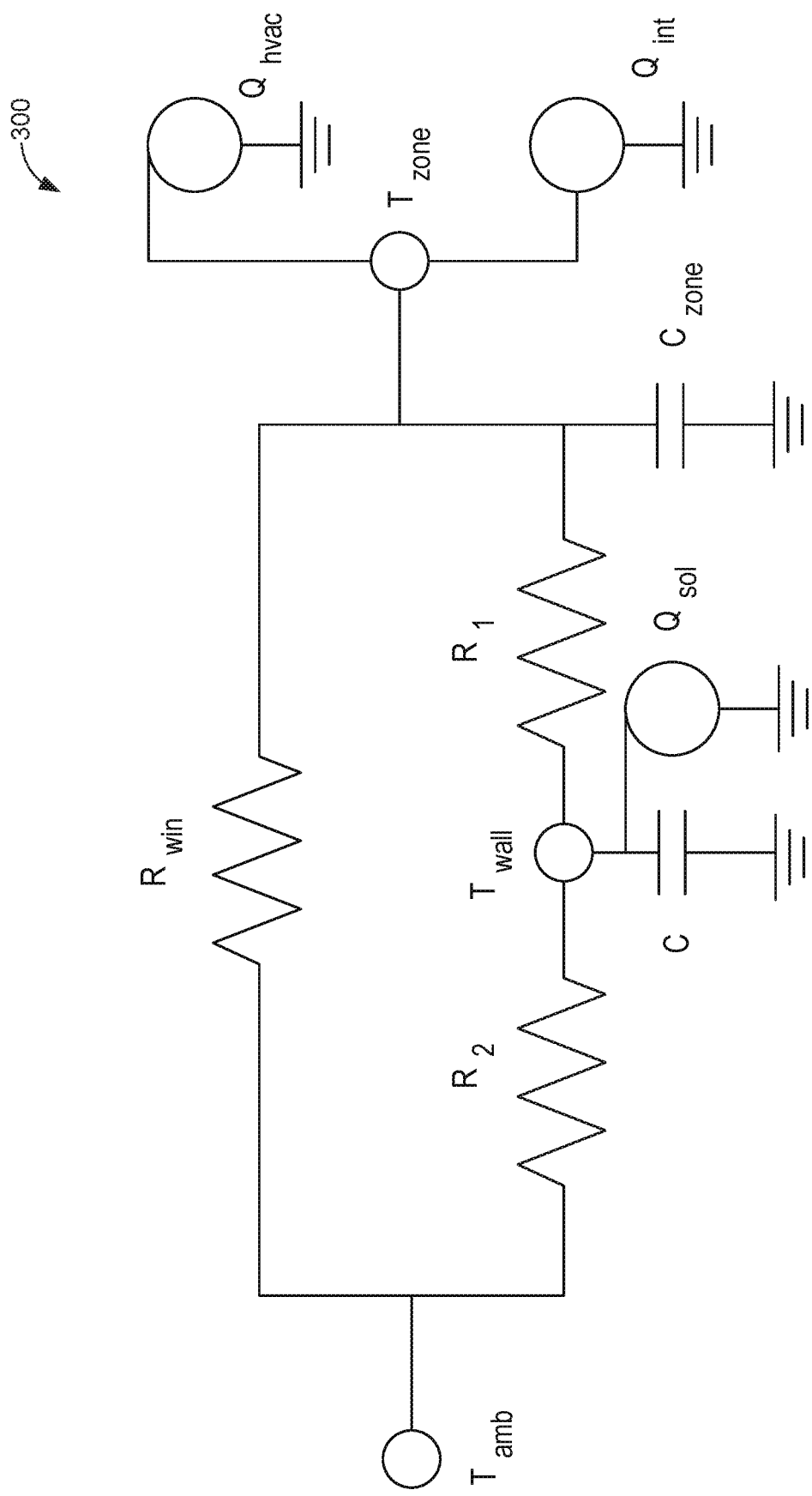
FIG. 3 is a circuit diagram for a 2R1C thermal network according to various embodiments of the present disclosure.

With reference to FIG. 3, shown is a reduced order thermal resistance and capacitance (RC) network model 300 according to various embodiments of the present disclosure. The network model 300 can have two temperature states, space temperature $T_{zone}$ and structure temperature $T_{wall}$, for each building 106.

The temperature states, $T_{wall}$ and $T_{zone}$, of the "superzone" can be given by:

$$C\dot{T}_{wall} = \frac{T_{amb} - T_{wall}}{R_2} + \frac{T_{zone} - T_{wall}}{R_1} + Q_{sol} \quad (5)$$

$$C_{zone}\dot{T}_{zone} = \frac{T_{wall} - T_{zone}}{R_1} + \frac{T_{amb} - T_{zone}}{R_{win}} + Q_{int} + Q_{hvac}$$

where $R_1$, $R_2$, and $R_{win}$ are the aggregated thermal resistances of the exterior structure, interior structure, and window; $C_{zone}$, and C are the aggregated thermal capacitances of the zone and walls' structure; $T_{amb}$, $T_{wall}$, and $T_{zone}$ are the ambient exterior temperature, the walls' structure temperature, and the aggregated zone temperature; and $Q_{sol}$, $Q_{int}$, and $Q_{hvac}$ are the solar disturbance heat gain, the internal heat gain from the miscellaneous power consumption, and the HVAC load from the conditioning power consumption.

The state-space format for a single building indexed by n can be expressed as:

$$\dot{x}_b^n = A_b^n x_b^n + B_{ub}^n u_b^n + B_{wb}^n w_b^n \quad (6)$$

where $$x_b^n = \begin{bmatrix} T_{wall} \\ T_{zone} \end{bmatrix}$$

are building temperature states;

$u_b^n = \eta Q_{hvac} = P_{hvac}$ is the building conditioning control input and $\eta$ is the coefficient of performance of the HVAC systems;

$$w_b^n = \begin{bmatrix} T_{amb} \\ Q_{sol} \\ Q_{int} \end{bmatrix}$$

are the building disturbances;

$$A_b^n = \begin{bmatrix} -\frac{R_1 + R_2}{CR_1R_2} & \frac{1}{CR_1} \\ \frac{1}{C_{zone}R_1} & -\frac{R_1 + R_{win}}{C_{zone}R_1R_{win}} \end{bmatrix}$$

is the coefficient matrix of the building states;

$$B_{ub}^n = \begin{bmatrix} 0 \\ \frac{1}{C_{zone}} \end{bmatrix}$$

is the coefficient matrix of the control inputs; and $$B_{wb}^n = \begin{bmatrix} \frac{1}{CR_2} & \frac{1}{C} & 0 \\ \frac{1}{C_{zone}R_{win}} & 0 & \frac{1}{C_{zone}} \end{bmatrix}$$

is the coefficient matrix of the building disturbances.

For the integration between buildings and grids, the global dynamics of a cluster of the buildings 106 can be expanded from a single building 106, such as the building n from Equation (6). The method assumes that all buildings 106 are operating with same time-scales of the power system dynamics. If there are no connections between the buildings, the global state-space dynamics of the building cluster comprised of a total of n buildings can be derived as follows:

$$\dot{x}_b = A_b x_b + B_{ub} u_b + B_{wb} w_b \quad (7)$$

where $$x_b = \begin{bmatrix} x_b^1 \\ x_b^2 \\ \vdots \\ x_b^n \end{bmatrix}_{2n \times 1}$$

are building cluster temperature states;

$$u_b = \begin{bmatrix} u_b^1 \\ u_b^2 \\ \vdots \\ u_b^n \end{bmatrix}_{2n \times 1}$$

are the building cluster control inputs;

$$w_b^n = \begin{bmatrix} w_b^1 \\ w_b^2 \\ \vdots \\ w_b^n \end{bmatrix}_{3n \times 1}$$

are the building cluster disturbances;

$$A_b = \begin{bmatrix} A_b^1 & & \\ & \ddots & \\ & & A_b^n \end{bmatrix}_{2n \times 2n}$$

is the coefficient matrix of the building cluster states;

$$B_{ub} = \begin{bmatrix} B_{ub}^1 & & \\ & \ddots & \\ & & B_{ub}^n \end{bmatrix}_{2n \times n}$$

is the coefficient matrix of the building cluster control inputs; and $$B_{wb} = \begin{bmatrix} B_{wb}^1 & & \\ & \ddots & \\ & & B_{wb}^n \end{bmatrix}_{2n \times 3n}$$

is the coefficient matrix of the building cluster disturbances.

To accurately estimate and predict the real-time operations of air-conditioning systems to meet the demand $P_{hvac}$, a model can be used that reflects the realistic and nonlinear characteristics of HVAC response. The type of HVAC systems can be categorized based on the building size or square footage. For small and medium-sized commercial buildings (<100,000 sq. ft.), the roof top air-handling units (RTUs) and heap pump system are widely used. General packaged RTUs serving single zones normally: 1) have a constant supply air flow, 2) cycle the compressor ON and OFF to meet the space thermal loads, and 3) do not maintain the discharge air set point temperature. The optimization system 103 can use a modelling approach based on performance curves to simulate and predict the system response.

According to one example, initially two independent temperature curves can be modelled by fitted the real-time measurements from the on-site RTUs: the total cooling capacity modifier (CCM) curve and the energy input ration (EIR) modifier curve. Both the CCM and EIR modifier curves are functions of the zone temperature and the outside air temperature. Thus, power consumption of RTU, $P_{RTU}$, can be defined as follows:

$$P_{RTU} = \frac{nQ_{ref}f_{EIR}f_{CCM}}{COP} \quad (8)$$

where $Q_{ref}$ is the reference consumption when RTU is on, n is the number of operated RTUs, $f_{EIR}=a_1+a_2T_z+a_3T_z^2+a_4T_o+a_5T_o^2+a_6T_zT_o$ is Energy Input Ratio (EIR) function, $f_{CCM}=b_1+b_2T_z+b_3T_z^2+b_4T_o+b_5T_o^2+b_6T_zT_o$ is total cooling capacity modifier (CCM) function, $T_o$ is the outdoor air temperature, $T_z$ is the zone air temperature, and COP is a constant parameter defined as coefficient of performance.

For large commercial buildings, the air handling units (AHUs) with a chiller and boiler system can be used. The air handling unit can control the ventilation flow rate mixing outdoor and indoor air while the chiller/boiler system can provide the chilled/hot water to the heat exchange inside the air handling unit. The total electricity power consumed by HVAC system is defined as:

$$P_{HVAC}=P_{chiller}+P_{pump}+P_{fan}+P_{boiler} \quad (9)$$

where $P_{pump}$, and $P_{fan}$ can be treated as constant when they are operated.

Performance curve based water-cooled chiller power consumption beyond the full capacity mode can be modelled as:

$$P_{chiller} = \frac{nQ_{ref}f_{EIR}f_{PLR}}{COP \cdot f_{CCF}} \quad (10)$$

where $Q_{ref}$ is the reference chiller consumption when chiller is on at full conditioning, n is the number of chillers operated, $Q_{AHU}$ is the AHU power demand from air-loop side, $f_{CCF}=a_1+a_2T_{cond}+a_3T_{cond}^2+a_4T_{chw}+a_5T_{chw}^2+a_6T_{cond}T_{chw}$ is Cooling Capacity Factor (CCF) function, $f_{EIR}=b_1+b_2T_{cond}+b_3T_{cond}^2+b_4T_{chw}+b_5T_{chw}^2+b_6T_{cond}T_{chw}$ is Energy Input Ratio (EIR) function, $f_{PLR}=c_1+c_2T_{cond}+c_3T_{cond}^2+c_4C_{PLR}+c_5C_{PLR}^2+c_6T_{cond}C_{PLR}+c_7C_{PLR}^3$ is Partial Load Ratio (PLR) function with $$C_{PLR} = \frac{Q_{AHU}}{Q_{ref}} = \frac{c_{air}m_{air}\Delta T_{AHU}}{Q_{ref}} = \gamma \frac{c_{water}m_{water}\Delta T_{chiller}}{Q_{ref}},$$

$c_{air}$ and $c_{water}$ are the heat capacity for AHU air and chiller water respectively, $m_{air}$ and $m_{water}$ are the mass flow rate for AHU air and chiller water respectively, $\Delta T_{AHU}$ and $\Delta T_{chiller}$ are the temperature difference of the air flow and the water flow of AHU and chiller respectively, $\gamma$ is the thermal efficiency between AHU and chiller, $T_{cond}$ the condenser discharge temperature of cooling tower, $T_{chw}$ is the chilled water supply temperature, and COP is a constant parameter defined as coefficient of performance.

Performance curve based air-cooled chiller power consumption beyond the full capacity mode can be modelled as:

$$P_{coil} = \frac{nQ_{ref}f_{EIR}f_{PLR}}{COP} \quad (11)$$

where $Q_{ref}$ is the reference chiller consumption when chiller is on at full conditioning, n is the number of chillers operated, $Q_{AHU}$ is the AHU power demand from air-loop side, $f_{EIR}=a_1+a_2T_z+a_3T_z^2+a_4T_o+a_5T_o^2+a_6T_zT_o$ is Energy Input Ratio (EIR) function, $f_{PLR}=c_1+c_2T_{cond}+c_3T_{cond}^2+c_4C_{PLR}+c_5C_{PLR}^2+c_6T_{cond}C_{PLR}+c_7C_{PLR}^3$ is Partial Load Ratio (PLR) function with $$C_{PLR} = \frac{Q_{AHU}}{Q_{ref}} = \frac{c_{air}m_{air}\Delta T_{AHU}}{Q_{ref}} = \gamma \frac{c_{water}m_{water}\Delta T_{chiller}}{Q_{ref}},$$

$c_{air}$ and $c_{water}$ are the heat capacity for AHU air and chiller water respectively, $m_{air}$ and $m_{water}$ are the mass flow rate for AHU air and chiller water respectively, $\Delta T_{AHU}$ and $\Delta T_{chiller}$ are the temperature difference of the air flow and the water flow of AHU and chiller respectively, $\gamma$ is the thermal efficiency between AHU and chiller, $T_o$ outdoor air temperature, $T_z$ is the AHU return air temperature, and COP is a constant parameter defined as coefficient of performance.

For hot water usages of HVAC systems, a boiler can be used. Boiler heating load can be represented by a summation of sensible and latent heat addition to the water stream as quantified by $Q_{AHU}$. The actual fuel consumption of the boiler can be calculated by using the following equation:

$$P_{boiler} = \frac{Q_{AHU}\gamma}{a + bB_{PLR} + cB_{PLR}} \quad (12)$$

where
$\gamma$ is thermal efficiency of boiler;

$$B_{PLR} = \frac{Q_{AHU}}{Q_{ref}} \text{ and } Q_{ref}$$

is the reference load of the boiler; and
a, b, and c are the coefficients of the par load ration function.

The disclosure noticed that the condenser discharging temperature and chiller water supply temperature are usually maintained at certain set points. The invention only controls the air flow of AHU and the supply water flow to cool the zone spaces to the desired set points. Assume a calibrated and accurate zone model is established by Equation (5), the AHU model can be embedded to Equation (6) and expressed as the followings:

$$\dot{g}_b^l = A_g^l g_b^l + B_u^l u_b^l + B_w^l w_g^l + B_\varphi^l \varphi(g_b^l, u_b^l, w_g^l) \quad (13)$$

Where:

$$g_b^1 = \begin{bmatrix} T_{wall} \\ T_{zone} \\ T_{sa} \end{bmatrix}$$

are building temperature states containing $T_{wall}$ (the structure temperature), $T_{zone}$ (the zone temperature), and $T_{sa}$ (the AHU supply air temperature);

$$u_b^1 = \begin{bmatrix} f_{air} \\ f_{water} \end{bmatrix}$$

are the building conditioning control inputs containing control variables $f_{air}$ (the AHU air flow) and $f_{water}$ (the chiller water flow);

$$w_b^1 = \begin{bmatrix} T_{amb} \\ Q_{sol} \\ Q_{int} \end{bmatrix}$$

are the building disturbances where the definitions are the same as Eq. (6);

$$A_g^1 = \begin{bmatrix} a_{11} & a_{12} & 0 \\ a_{21} & a_{22} & 0 \\ 0 & 0 & 0 \end{bmatrix}$$

is the coefficient matrix of the building states containing parameters $$a_{11} = -\frac{R_1 + R_2}{CR_1 R_2}, a_{21} = -\frac{1}{CR_1},$$

$$a_{21} = \frac{1}{C_{zone}R_1}, a_{22} = -\frac{R_1 + R_{win}}{C_{zone}R_1 R_{win}}$$

where the symbols are the same as Eq. (6);

$$B_u^1 = \begin{bmatrix} 0 & 0 \\ 0 & 0 \\ 0 & b \end{bmatrix}$$

is the coefficient matrix of the control inputs containing parameters $$b = -\frac{\rho_w C_w \Delta T_w}{\rho_a C_a V_{AHU}}$$

where $\rho_w$ is the water density, $\rho_a$ is the air density, $C_w$ is the water specific heat, $C_a$ is the air specific heat, $\Delta T_w$ is the temperature difference between the inlet and outlet chiller water, and $V_{AHU}$ is the AHU volume;

$$B_{wb}^n = \begin{bmatrix} c_{11} & c_{12} & 0 \\ c_{21} & 0 & c_{23} \\ 0 & 0 & 0 \end{bmatrix}$$

is the coefficient matrix of the building disturbances containing parameters $$c_{11} = \frac{1}{CR_2}, c_{12} = \frac{1}{C}, c_{12} = \frac{1}{C_{zone}R_{win}}, c_{23} = \frac{1}{C_{zone}}$$

where the symbols are the same as Eq. (6);

$$B_\varphi^1 = \begin{bmatrix} 0 & 0 & 0 \\ d_{21} & d_{22} & 0 \\ d_{31} & d_{32} & d_{33} \end{bmatrix}$$

is the coefficient matrix of the nonlinear part containing parameters $$d_{21} = -\frac{\rho_a C_a}{C_{zone}}, d_{22} = \frac{\rho_a C_a}{C_{zone}}, d_{31} = \frac{0.3}{C_{zone}},$$

$$d_{32} = -\frac{1}{V_{AHU}}, d_{33} = -\frac{0.7}{C_{zone}}$$

where the symbols are the same as Eq. (6); and $$\varphi(g_b^1, u_b^1, w_b^1) = \begin{bmatrix} f_{air}T_{wall} \\ f_{air}T_{zone} \\ f_{air}T_{amb} \end{bmatrix} \quad (5)$$

is the nonlinear part where variable definitions are the same as previous mentioned in Eq. (6).

There are many different types of rechargeable or secondary batteries, for example, lithium-ion battery, flow battery, nickel metal hydride, lead acid, and more. Within lithium-ion battery chemistries, there are many chemistry types in terms of anode, cathode, and electrolyte differences such as carbon anode based, lithium titanate oxide (LTO) based, carbon silicon composite anode based, silicon anode based, lithium metal anode based, various metal anode based, and oxide anode based in the anode; lithium cobalt oxide (LCO) cathode based, lithium nickel/manganese/cobalt oxide (NMC) cathode based, lithium nickel oxide (LNO) cathode based, lithium nickel/cobalt/aluminum (NCA) cathode based, lithium-rich LNMC cathode based, lithium manganese oxide (LMO, spinel) or elemental modified/doped cathode based, lithium iron phosphate (LFP) or elemental modified/doped cathode based, mixed oxide cathode based, and more for cathode. If electrolyte is used to differentiate the lithium-ion battery types, there are organic electrolyte liquid based, solid state electrolyte based, and polymer-gel based. From battery single cell package and foreign factor, there are cylindrical shape, pouch shape in laminated pouch shape, and prismatic shape in metal container, plastic container, and packaged by aluminum laminate film.

Single cells can be fabricated into module to obtain high voltage in series and high capacity in parallel. The modules can be subsequently connected in series to boost voltage for a specifically designed battery pack to have certain energy in kWh. Battery module and pack can be electrically managed by battery management system (BMS) 112, which provides electrical and environmental parameters such as voltage, current, and temperature. The BMS 112 can provide the state of charge (SOC) of battery and the state of health (SOH) of battery. When the lithium-ion battery is used as a propulsion to any electric vehicle applications, the battery end of life (EOL) can be defined as either having 20% capacity fading (80% capacity retention from its initial capacity or the battery beginning of life (BOL)) or having 30% power fading/loss (70% power retention from its initial peak discharge power at a fixed SOC point).

Due to the difference of battery materials used, each type of lithium-ion battery can have very different degradation mechanisms. The lithium-ion battery degradation mechanisms can include two degradation functions, battery operation degradation function and battery calendar life degradation function, among others. The battery operation cycle life degradation function can take six battery operation components into consideration, and these six components are: 1) battery working temperature, 2) battery operation SOC window, 3) accumulative battery discharge power, 4) accumulative battery charge power, 5) accumulative maximum/peak/allowable battery discharge power, and 6) accumulative maximum/peak/allowable battery charge power. The battery calendar life degradation function can take three battery conditions into consideration, and these three conditions are: 1) battery temperature during calendar time, 2) battery SOC status, and 3) accumulative battery calendar time. The battery energy storage system degradation models can be derived by a systematic testing using well-designed test matrices when a specific lithium-ion battery is selected for the specific applications or use cases.

Both absolute values of battery capacity fading/loss and power fading/loss can be expressed as:

$$Q_{loss}^{batt} = \{f_{op}(T_{batt}, \Delta SOC, \Sigma_{t=1}^{h} P_d^{batt}(t), \Sigma_{t=1}^{h} P_c^{batt}(t), \Sigma_{k=1}^{md} \max_t((P_d^{batt}(t)), \Sigma_{k=1}^{mc} \max_t((P_c^{batt}(t)) + f_{cal}(T_{batt}, SOC, t_{cal})\} * Q_0^{batt} \quad (14)$$

$$P_{loss}^{batt} = \{f_{op}(T_{batt}, \Delta SOC, \Sigma_{t=1}^{h} P_d^{batt}(t), \Sigma_{t=1}^{h} P_c^{batt}(t), \Sigma_{k=1}^{md} \max_t((P_d^{batt}(t)), \Sigma_{k=1}^{mc} \max_t((P_c^{batt}(t)) + f_{cal}(T_{batt}, SOC, t_{cal})\} * Q_{d0}^{batt,max} \quad (15)$$

where: $f_{op}$: battery operation cycle life degradation function; $f_{cal}$: battery calendar life degradation function; $Q_0^{batt}$: battery initial nominal capacity; $Q_{loss}^{batt}$: battery capacity loss; $P_{d0}^{batt,max}$: battery maximum/peak/allowable discharge power at a fixed SOC point (e.g., 50%, 40%, 30%, 20%, or 10%; generally, 20% is preferred) at the beginning of life (BOL), which can be calculated by various methods during a specifically defined test plan; $P_{loss}^{batt}$: battery power loss correlated to $P_{d0}^{batt,max}$ due to battery degradation from operation cycle life and calendar life at time t; $T_{batt}$: battery working/operation temperature or calendar life temperature in kelvin; $\Delta SOC$: battery operation SOC window; $P_d^{batt}(t)$: battery discharge power at time t during operation cycle; $P_c^{batt}(t)$: battery charge power at time t during operation cycle; $t_{cal}$: battery calendar life; md: number of maximum allowable discharge power during operation; and mc: number of maximum allowable charge power during operation.

With respect to solar and load forecasting models, data-driven models using machine learning algorithms can be utilized for building load and solar production forecasts. Models can be based on Artificial Neural Network (ANNs), Support Vector Regression (SVR), and Least-square Support Vector Machine (LS-SVM). For ANNs, feed forward neural networks (FFNNs) of a single layer and a double layer configuration can be used, among other configurations. The performance of FFNN can depend strongly on the parameter settings. For example, the FFNN can be modeled as 1 hidden layer with more than 20 neurons, 1 output neuron (the prediction of building load or power production), and different inputs neurons (several time lagged values of historical information, meteorological inputs and time information). The FFNNs model structure can be defined, such as, for example, the number of hidden layers, the number of neurons in each layer, and the appropriate learning algorithms. Inputs to a neuron can be external stimuli or directly outputs from the other neurons. Neurons can calculate the weights sum of the inputs and produce the output by transfer functions:

$$y = \sum_{j=1}^{N} w_j \phi_j \left[ \sum_{i=1}^{M} w_{ij} x_i + w_{io} \right] + w_{jo} \quad (16)$$

where w is the weight for input layer, hidden layer, and output layer indexed by i, j, and o, x is the training input, y is the training output, N represents the total number of hidden units, M represents the total number of inputs, and φ represents the learning function for each hidden unit.

For SVR, the model approximates the inputs and outputs using the following form:

$$f(x) = w\varphi(x) + b \qquad (17)$$

Where $\varphi(x)$ represents the transfer function mapping the input data to the high dimensional feature spaces. The support vectors are the points which mark the margins of the tube. They are learned through a quadratic minimization problem of the equivalent Lagrangian form of the SVR. The optimization function is:

$$\min \frac{1}{2} w^T \cdot w + C \sum_{i=1}^{n} (\xi_i + \xi_i^*) \qquad (18)$$

$$\text{s.t.} \quad y_i - w^T \varphi(x_i) - b \leq \varepsilon + \xi_i$$
$$w^T \varphi(x_i) - b - y_j \leq \varepsilon + \xi_i^*$$

Where w is the weight for regression, $\xi$ is the error slack guaranteeing the solutions for the optimization, C is the regularized penalty, $\varepsilon$ defines the desired tolerance range of the "tube" and $\varphi$ is the kernel function. The parameters can be determined by cross-validation based on mean square error to fit the training data.

LSSVM, like SVR, is modeled on a high dimension space. The main difference is the constraints are changed from inequality to equality. Then, the simplified cost function can be optimized by least square method as:

$$\min \frac{1}{2} w^T \cdot w + C \sum_{i=1}^{n} e_i^2 \qquad (19)$$

$$\text{s.t.} \quad y_i - w^T \varphi(x_i) + b + e$$

Here, the model has fewer parameters (C and $\gamma$) to be optimized than SVR.

The parameters of Eq. (7) could be optimized and defined as:

$$\min \sum_{i=1}^{n} (x_i - T_i)^2 \qquad (20)$$

$$\text{s.t.} \quad \dot{x}_b = A_b x_b + B_{ub} u_b + B_{wb} w_b$$

Where $T_i$ is the measured temperatures, n is the total measurement period and i is the time step.

This problem can be referred to as a constrained nonlinear optimization. The subspace trust region solver based on the interior-reflective Newton method can be selected. The accuracy of parameters validation is the Root Mean Square Error (RMSE). RMSE quantifies the deviations of predicted values from measured values over the whole measurement period. The RMSE is defined as:

$$RMSE = \sqrt{\frac{1}{n} \sum_{i=1}^{n} (x_i - T_i)^2} \qquad (21)$$

If the measurement, namely, temperatures are not available, state estimation techniques can be applied to calibrate the models for different building and battery systems. Auto-regressive with exogenous input model structure can be utilized to represent the dynamics of the states. The general format can be defined as follows:

$$y(t) + \sum_{i=1}^{n_y} a_i y(t-i) = \sum_{i=1}^{n_u} \sum_{j=1}^{n_b} b_j u_i(t-i) \qquad (22)$$

where y denotes model outputs and $u_i$ are model inputs. Structure of the model, i.e., the set of parameters $n_y$, $n_u$, and $n_b$ can be selected with the help of the system identification toolbox. An initial guess for the model order can be obtained by using the information criterion, e.g. Akaike's information criterion. The model order can be further modified using iteration optimization to improve data fitting and transient response of the model.

Figure 4:
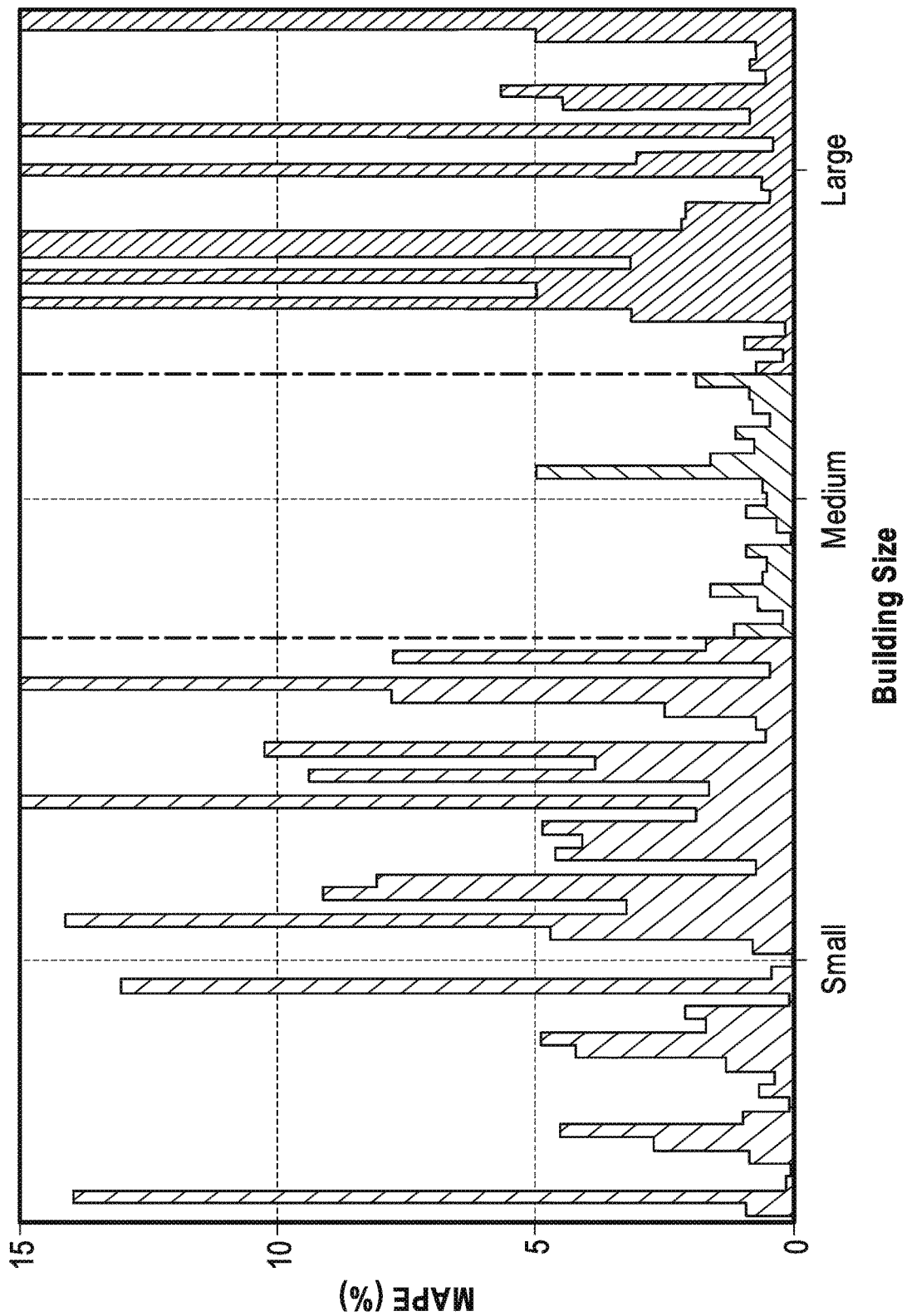
FIG. 4 is a chart showing 24-hour ahead building load forecasting mean absolute percentage error (MAPE) using a smart meter data set according to various embodiments of the present disclosure.

With reference to FIG. 4, shown is an example chart of load forecasting results with a period of 3 months in terms of Mean Absolute Percentage Error (MAPE) for 92 commercial buildings across the U.S.A based on smart meter data. The building size is categorized according to their peak demand as small (smaller than 50 kW), medium (larger than 50 kW but smaller than 100 kW), and large (larger than 100 kW). The prediction step is 24-hour ahead with 15-minute interval, although other predictions steps could be used. For small commercial building, the average accuracy is 4.23%. For medium commercial building, the average accuracy is 2.10%. For large commercial building, the average accuracy is 9.46%.

Figure 5:
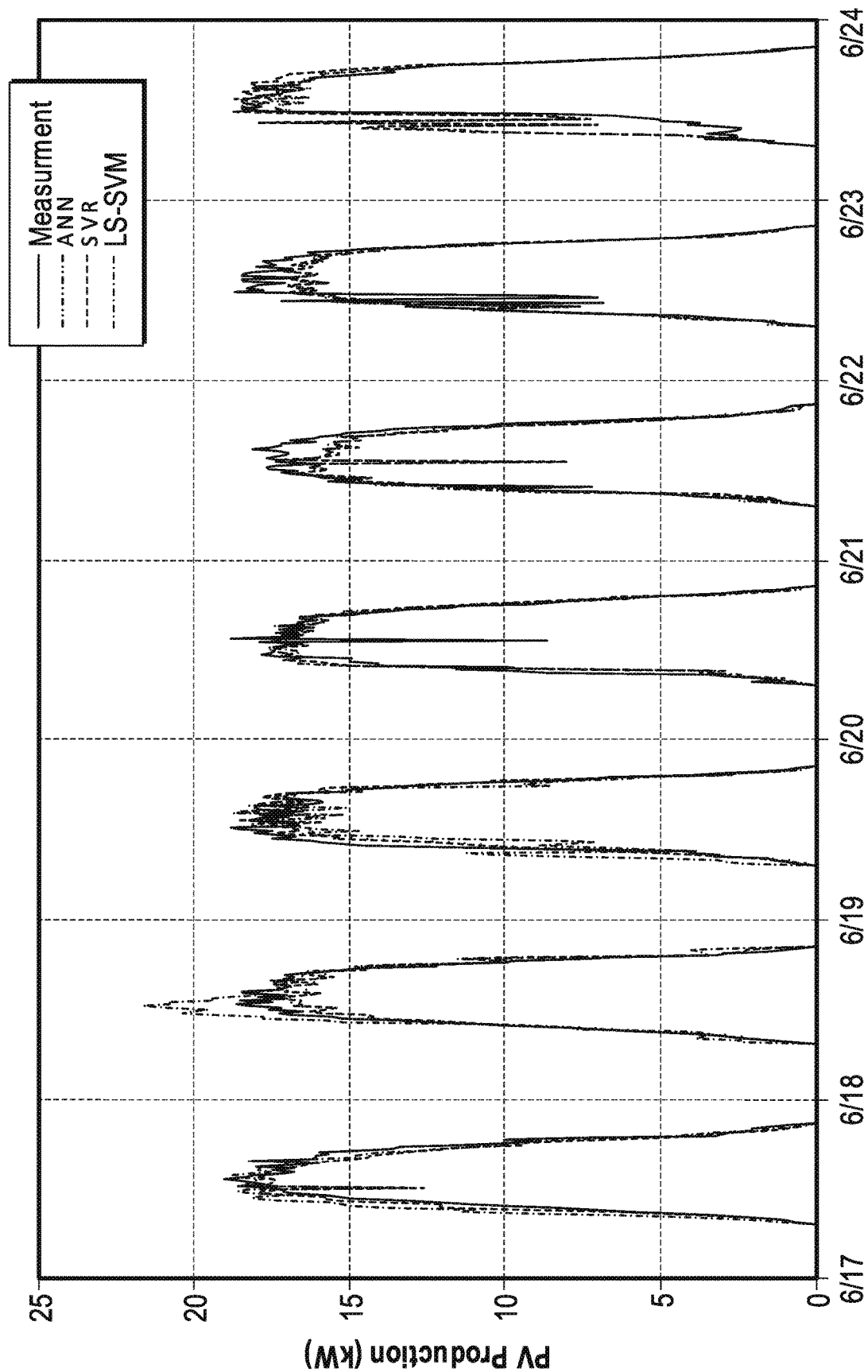
FIG. 5 is a chart illustrating 24-hour ahead PV production forecasting results using ANN, SVR, and LS-SVM compared to measurements according to various embodiments of the present disclosure.

Turning to FIG. 5, shown are example forecasting results for sunny days using the disclosed methods. On site solar PV data from a test site in San Antonio were used to test the forecasting abilities of PV power generations of three methods. The PV has peak size around 20 kW. The training period was one month with predicting period from Jun. 17, 2016 to Jun. 24, 2016. The forecasting errors were 0.41%, 0.11% and 2.14% Mean Absolute Percentage Error for ANN, SVR, and LS-SVM respectively.

Figure 6A:
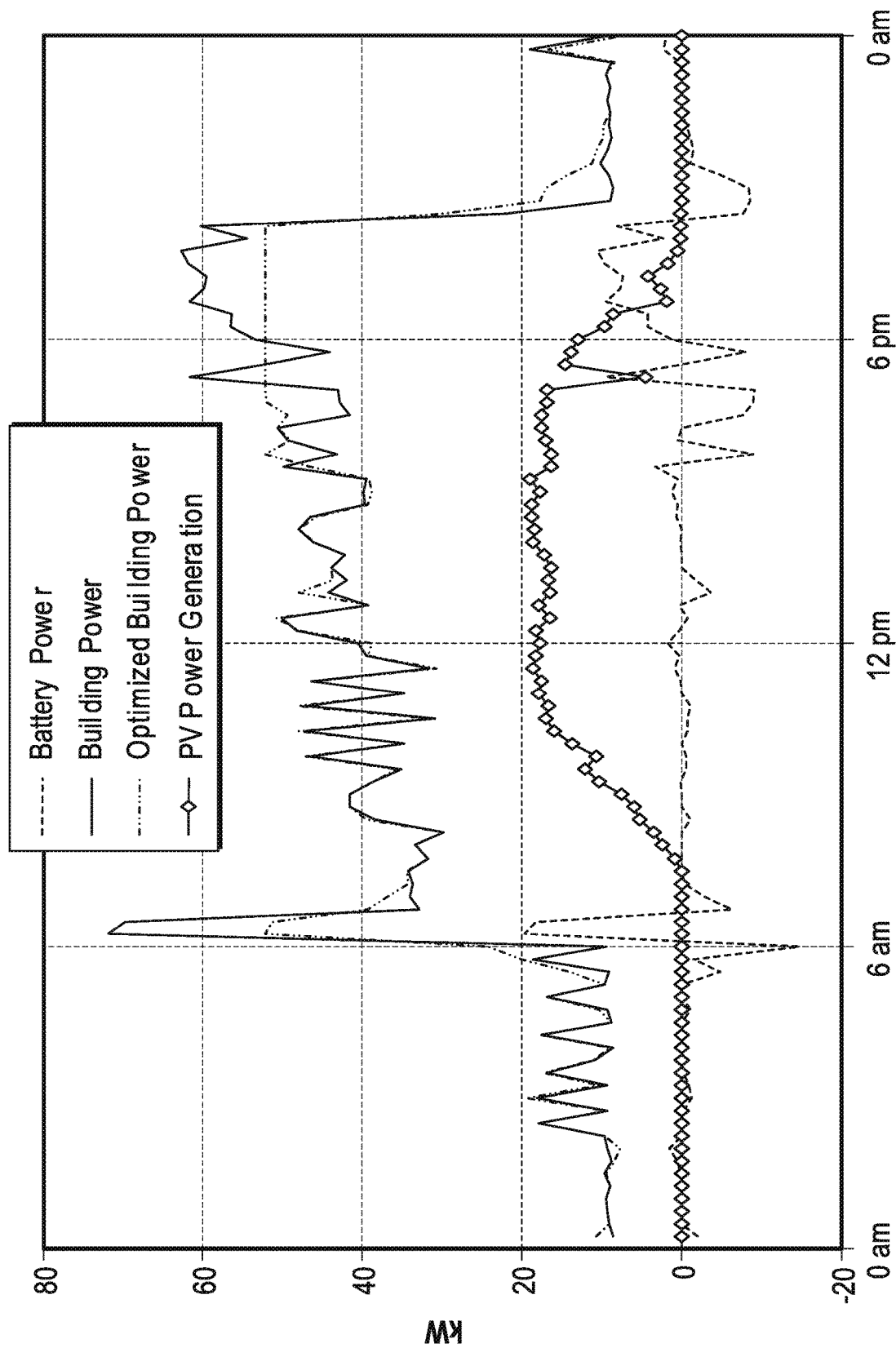
FIGS. 6A and 6B illustrate single building power usage optimization using a battery energy storage system MPC with PV forecasting for a Texas utility (6A) and a California utility (6B) according to various embodiments of the present disclosure.
Figure 6B:
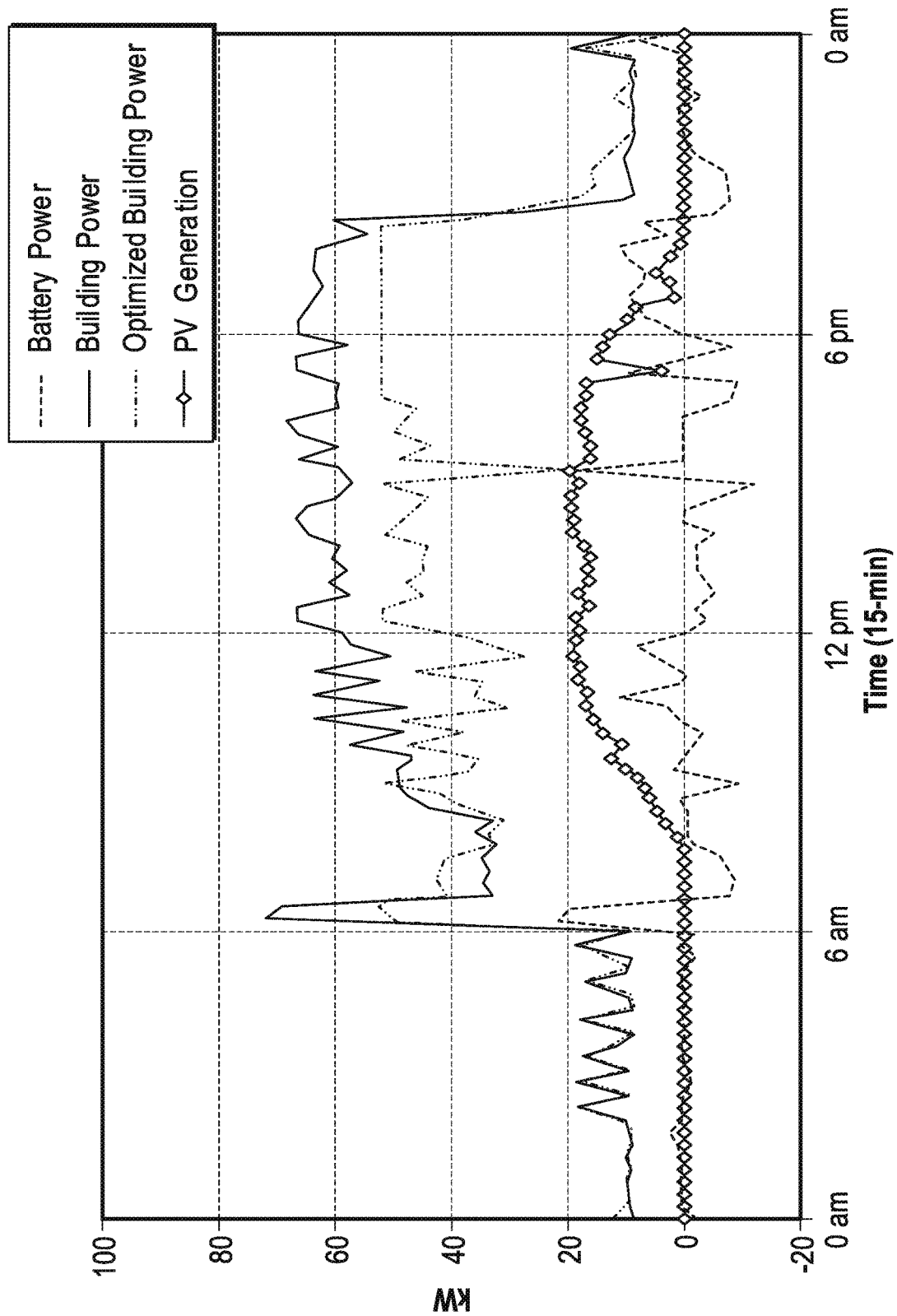

With reference to FIGS. 6A and 6B, shown are simulation results of battery energy storage system MPC using algorithms disclosed herein along with PV forecasting for a test site of a single building. The data was all collected in field from a small commercial building. The MPC used in this example was a 24-hour ahead prediction horizon for PV generation and battery energy storage systems. The potential peak shavings were demonstrated by optimized load (Optimized Building Power) comparing to the original load (Building Power). The peak cost reductions are around 26.13% for Texas utility and 27.98% for California utility by optimizing battery energy storage and PV distributed energy resources (DERs).

Figure 7A:
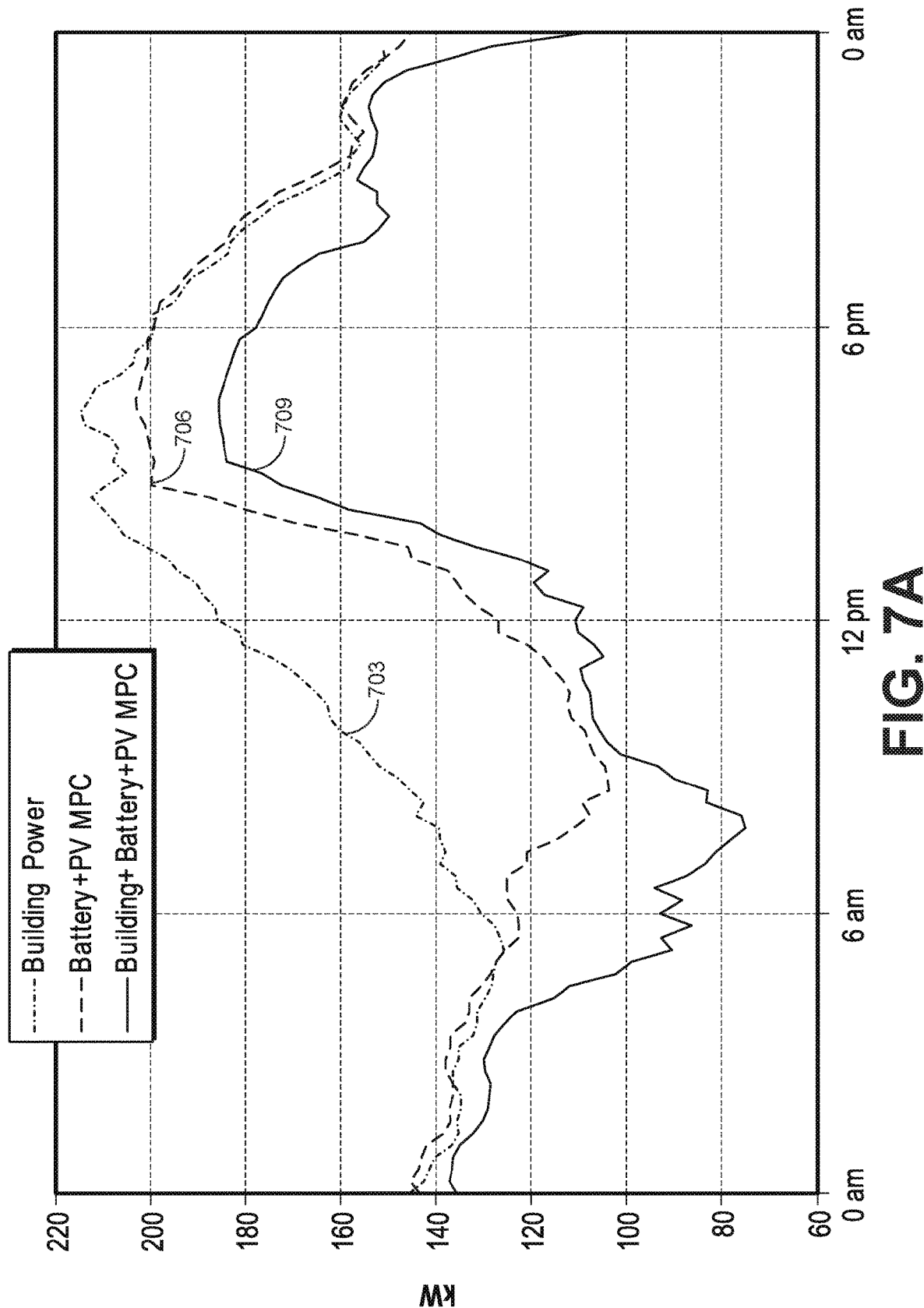
FIGS. 7A and 7B illustrate a single building power usage optimization using integrated MPC to building, battery energy storage system, and PV systems for a Texas utility (7A) and a California utility (7B) according to various embodiments of the present disclosure.
Figure 7B:
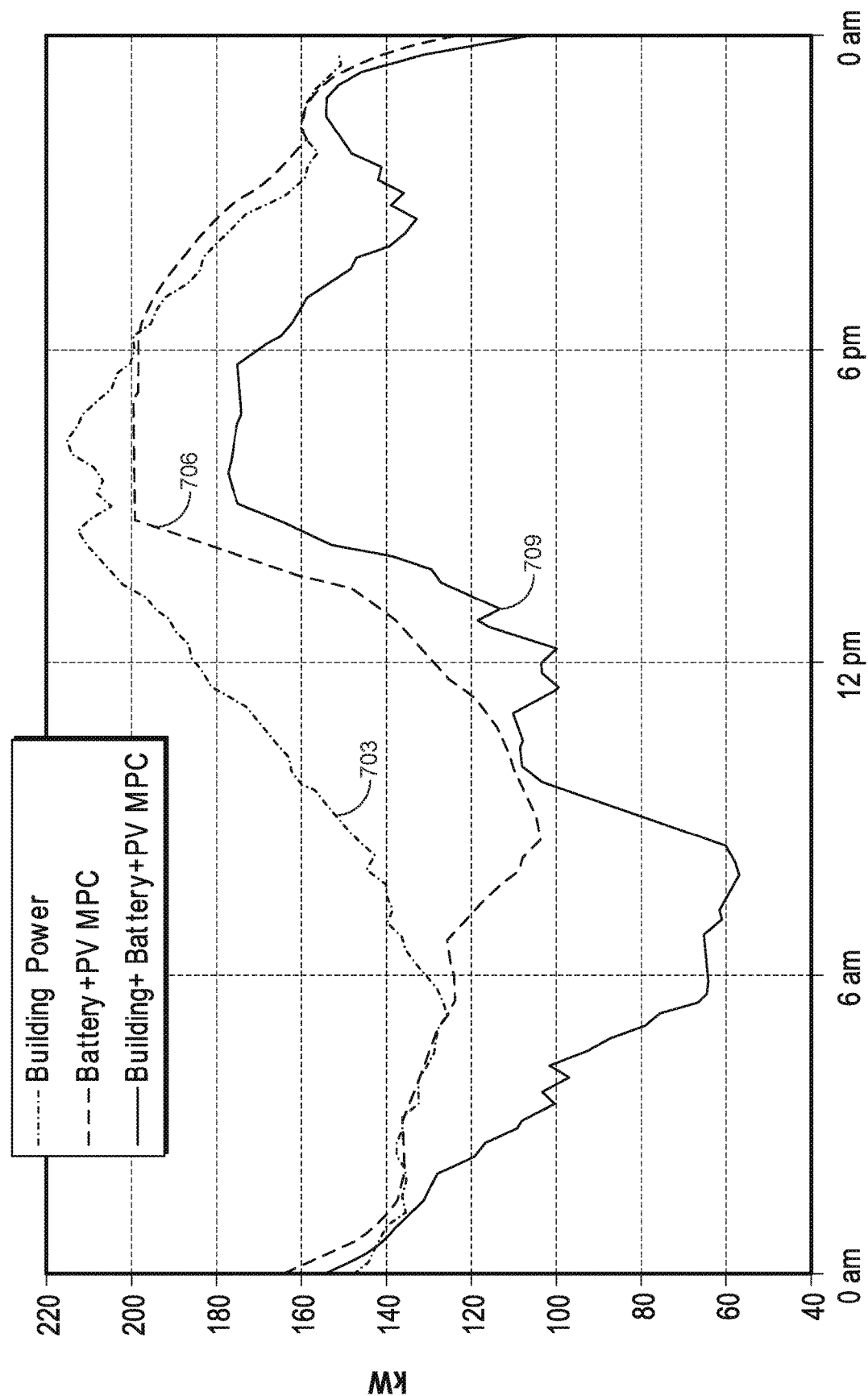

With reference to FIGS. 7A and 7B, shown are simulation results of an integrated MPC of building, battery energy storage system, and PV generation using algorithms disclosed herein for a test site of a large commercial building. The data was collected in field from installed sensors and building management system. The MPC used in this example was a 24-hour ahead prediction horizon for building HVAC, PV generation, and battery energy storage systems. The potential energy usage saving by PV generation is shown by MPC of battery and PV systems 706, comparing to baseline without any controls 703. The maximum energy saving is shown by integrated MPC of building, battery energy storage system, and PV systems 709, comparing to other control cases 703 and 706. Peak shaving potentials are shown at period around from 12 pm to 6 pm. The maximum energy usage saving is around 18.42% and the maximum peak demand saving is around 9.61% for a Texas utility. The maximum energy usage saving is around 25.66% and the maximum peak demand saving is around 15.59% for a California utility.

Figure 8A:
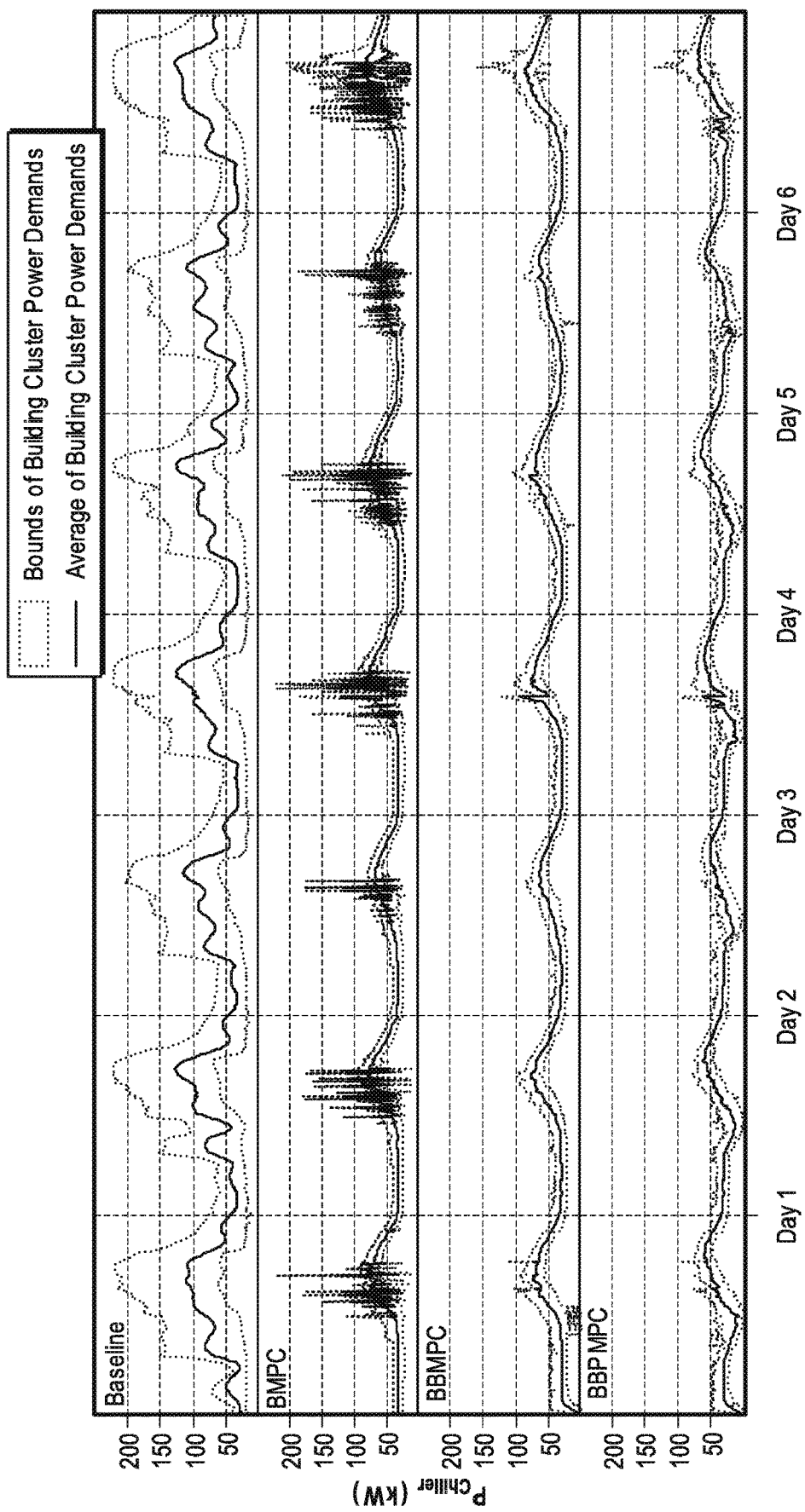
FIG. 8A illustrates chiller power load profiles of a building cluster based on four control scenarios for large commercial buildings according to various embodiments of the present disclosure.
Figure 8B:
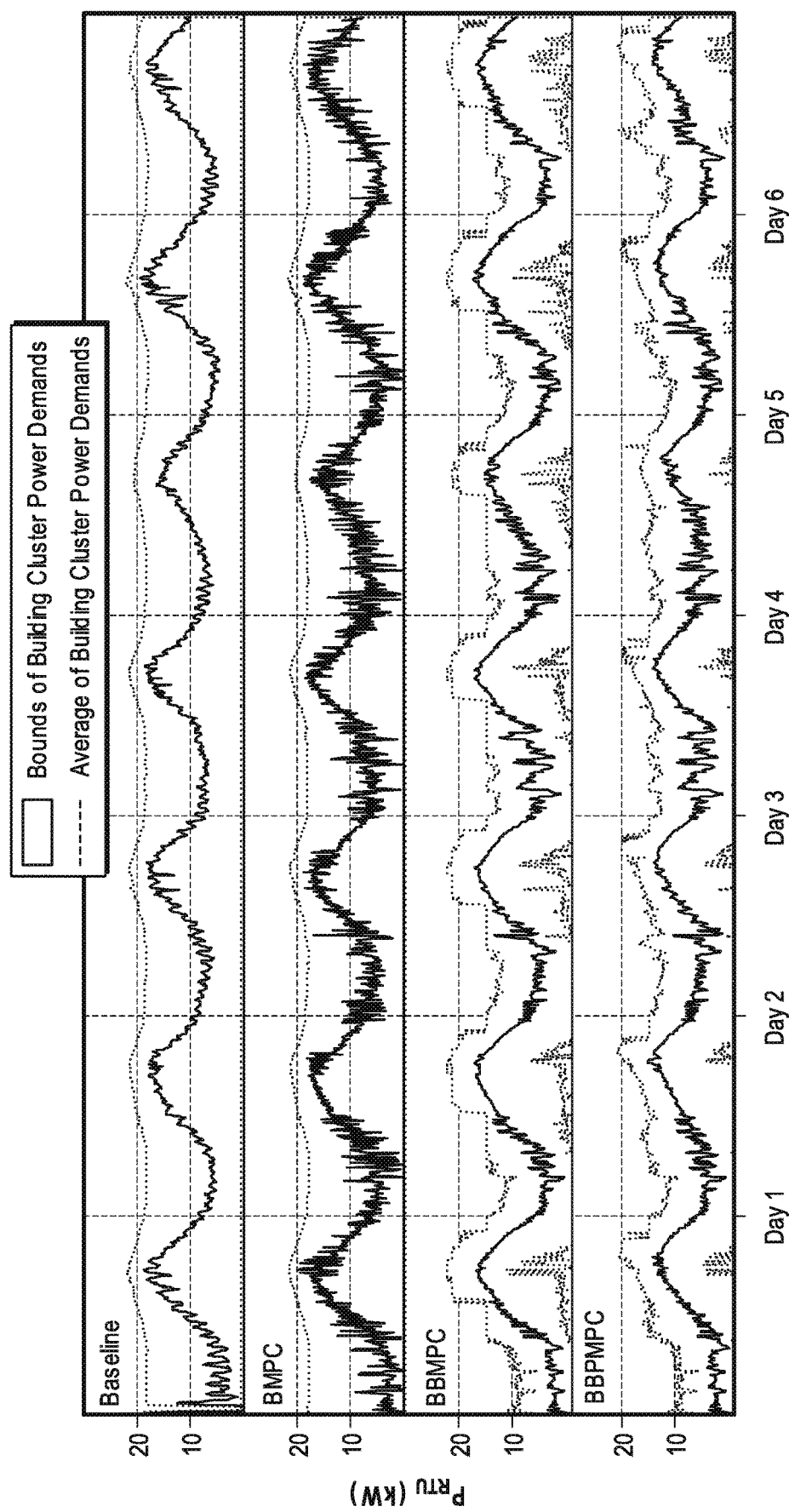
FIG. 8B illustrates RTU power load profiles of a building cluster based on four control scenarios for small commercial buildings according to various embodiments of the present disclosure.

With reference to FIGS. 8A and 8B, shows are simulation results of integrated MPC of building cluster with battery energy storage and PV system using algorithms disclosed herein for synthetic data of 1,000 buildings based on randomization of real building sample for large and small commercial buildings. Three control strategies were compared to evaluate all possible energy cost saving, power demand reduction, and energy usage reduction potentials. The total four control scenarios are defined as: 1) BC (building baseline control), 2) BMPC (building model predictive control), 3) BBMPC (building and battery energy storage model predictive control), and 4) BBPMPC (building, battery energy storage, and PV system model predictive control). Here, BC means building baseline control without any grid information input, battery energy storage and PV system participations. BMPC is building MPC with grid information input. BBMPC is building and battery energy storage MPC with grid information input. BBPMPC is the completed MPC of building, battery energy storage, and PV system which is disclosed herein. Noted that two separate scenarios using all four controls were evaluated based on whether the buildings are large or small in San Antonio, Tex. Energy cost savings, power demand, and energy usage reduction are presented in Table 1 and 2.

TABLE 1

Total Cost, Demand, and Energy Usage Reductions of a Large Commercial Building Cluster

| | BC | BMPC | BBMPC | BBPMPC |
|---|---|---|---|---|
| Energy Cost (in $1,000) | $1,285 | $1,092 | $972 | $842 |
| Cost Reduction (%) | — | 14.98 | 24.33 | 34.46 |
| Peak Demand Reduction (%) | — | 7.62 | 24.27 | 35.81 |
| Energy Usage Reduction (%) | — | 24.18 | 24.41 | 32.78 |

TABLE 2

Total Cost, Demand, and Energy Usage Reductions of a Small Commercial Building Cluster

| | BC | BMPC | BBMPC | BBPMPC |
|---|---|---|---|---|
| Energy Cost (in $1,000) | $333 | $328 | $315 | $282 |
| Cost Reduction (%) | — | 1.34 | 5.22 | 15.18 |
| Peak Demand Reduction (%) | — | 0.20 | 6.56 | 15.84 |
| Energy Usage Reduction (%) | — | 3.13 | 3.13 | 14.15 |

Figure 9:
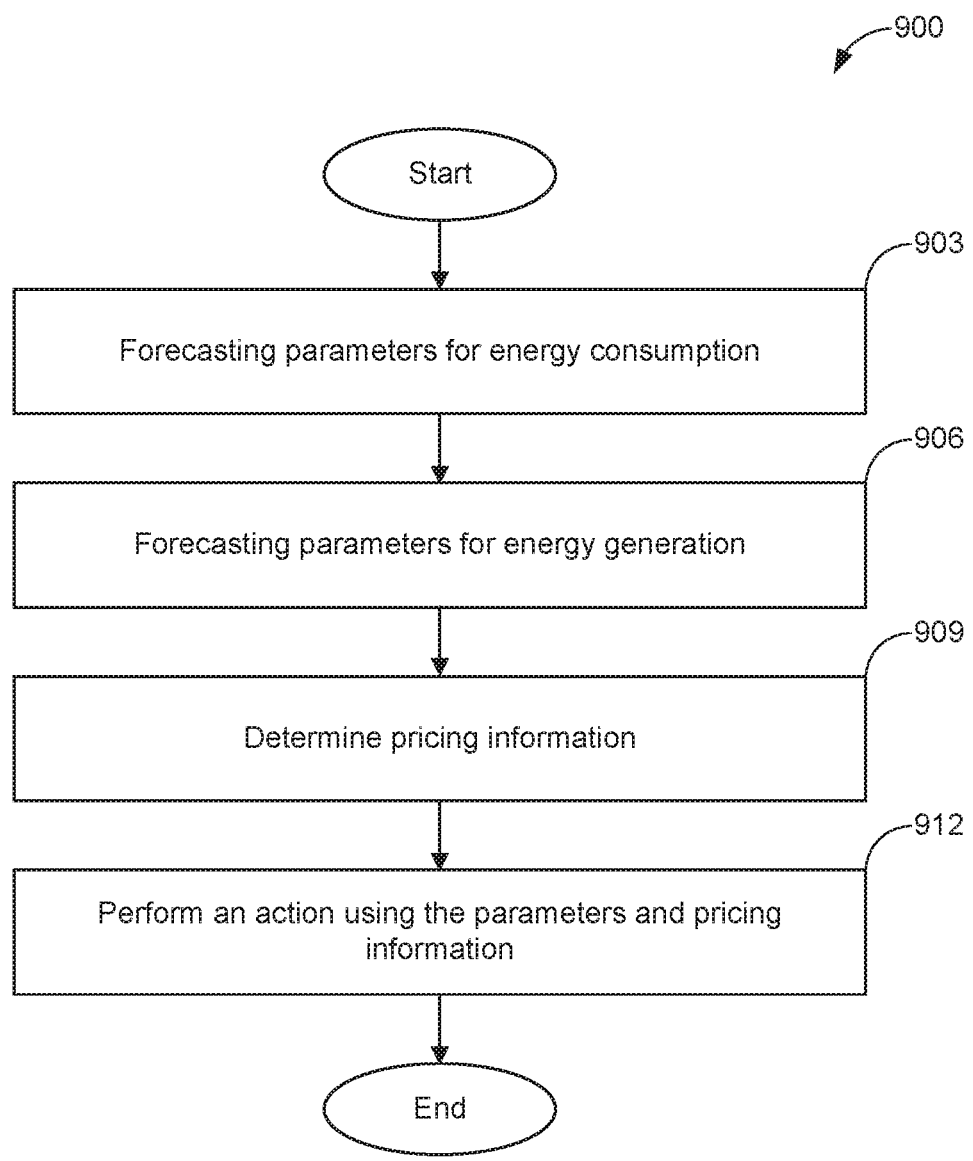
FIG. 9 illustrates an example flowchart of certain functionality implemented by portions of the optimization system executed in the networked environment of FIG. 1 according to various embodiments of the present disclosure.

Before turning to the process flow diagrams of FIG. 9, it is noted that embodiments described herein may be practiced using an alternative order of the steps illustrated in FIG. 9. That is, the process flows illustrated in FIG. 9 is provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments.

With reference to FIG. 9, shown is an optimization process 900 according to various embodiments of the present disclosure. The optimization process 900 can be performed by the optimization system 103 in the networked environment 100, or by one or more elements of the networked environment 100.

At box 903, the optimization process 900 can include forecasting one or more parameters for energy consumption. As an example, the optimization system 103 can forecast an energy demand for one or more buildings 106. The optimization system 103 can base the forecast on one or more weather forecasts for areas corresponding to each of the one or more buildings 106. The optimization system 103 can forecast occupancy for the one or more buildings 106. In some embodiments, the forecast of occupancy can correspond to one or more individuals and to one or more rooms in the buildings 106. The energy consumption for the buildings 106 can be based on the occupancy information. The optimization system 103 can utilize sample average approximation stochastic programming to forecast the energy demand of the buildings 106. The optimization system 103 can forecast the energy demand based on a reduced order thermal resistance and capacitance network model.

At box 906, the optimization process 900 can include forecasting one or more parameters for energy generation. As an example, the optimization system 103 can forecast a quantity of renewable power to be generated from one or more energy generation sources. The quantity of renewable power can be based on a variety of factors including a history of power generation from each of the energy generation sources, a weather forecast for a local area for each of the energy generation sources, a date and time for the period of generation, and other factors. The optimization system 103 can determine an amount of energy available from a battery management system. The optimization system 103 can obtain a state of health for the battery energy storage system. The battery energy storage can be based on a chemical composition of an anode, a cathode, and an electrolyte of one or more battery.

At box 909, the optimization process 900 can include determining pricing information for a grid. As an example, the optimization system 103 can determine pricing information for one or more grids or micro grids. The optimization system 103 can calculate the pricing information using dynamic real-time pricing information.

At box 912, the optimization process 900 can include performing an action based on the parameters and/or pricing information. The optimization system 103 can optimize a scheduling of charging and discharging of the battery energy storage using the forecasted quantity of generated power, forecasted power consumption, and grid pricing.

Figure 10:
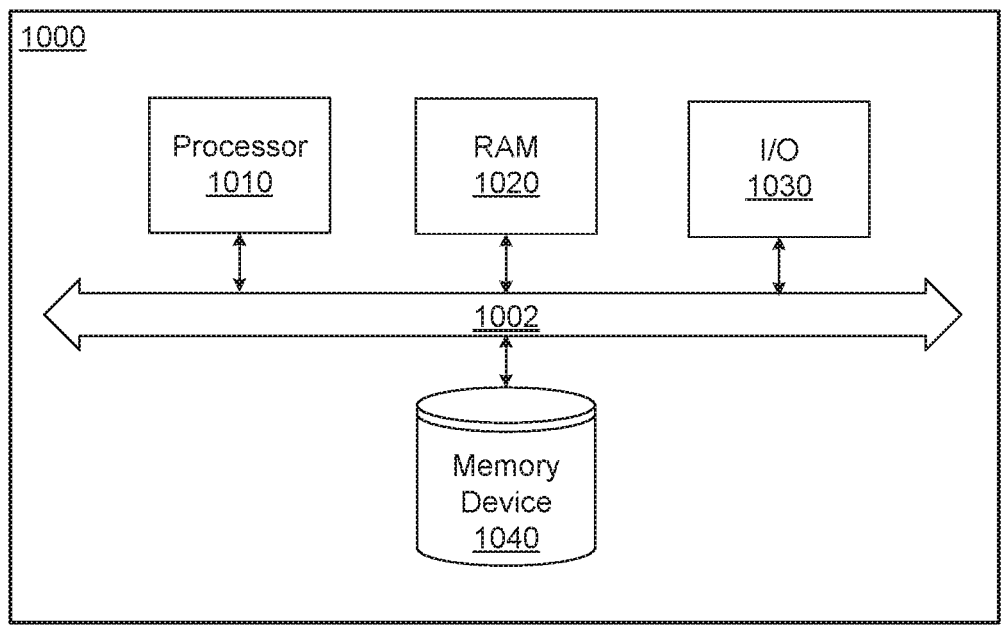
FIG. 10 is a schematic block diagram that illustrates an example computing device employed in the networked environment of FIG. 1 according to various embodiments.

Turning to FIG. 10, an example hardware diagram of a general purpose computer 1000 is illustrated. Any of the elements in the networked environment 100 including, but not limited to, the optimization system 103, the building energy management system 109, the battery management system 112, the power generation devices 115a and 115b, the grid 118, and the message bus 121, among others, using one or more elements of the general purpose computer 1000. The computer 1000 includes a processor 1010, a Random Access Memory ("RAM") and a Read Only Memory ("ROM") 1020, an Input Output ("I/O") interface 1030, and a memory device 1040. The elements of the computer 1000 are communicatively coupled via a bus 1002.

The processor 1010 comprises any well-known general purpose arithmetic processor or Application Specific Integrated Circuit ("ASIC"). The RAM and ROM 1020 comprise any well-known random access or read only memory device that stores computer-readable instructions to be executed by the processor 1010. The memory device 1040 stores computer-readable instructions thereon that, when executed by the processor 1010, direct the processor 1010 to execute various aspects of the present invention described herein. When the processor 1010 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 1040 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface comprises hardware interfaces to communicate over data networks. The I/O interface 1030 comprises device input and output interfaces such as keyboard, pointing device, display, communication, and other interfaces. The bus 1002 electrically and communicatively couples the processor 1010, the RAM/ROM 1020, the memory device 1040, a network interface, and the I/O interface 1030, so that data and instructions may be communicated among them.

In operation, the processor 1010 is configured to retrieve computer-readable instructions stored on the memory device 1040, the RAM/ROM 1020, or another storage means, and copy the computer-readable instructions to the RAM/ROM 1020 for execution, for example. The processor 1010 is further configured to execute the computer-readable instructions to implement various aspects and features of the present invention. For example, the processor 1010 may be adapted and configured to execute the processes described above with reference to FIG. 9, including the processes described as being performed by the modules of the optimization system 103. Also, the memory device 1040 may store the data stored in the database 127.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Clause 1. A system comprising: a data store; and at least one computing device in communication with the data store, the at least one computing device configured to at least: forecast a quantity of renewable power from a plurality of renewable energy generation sources; forecast an energy demand for at least one building; determine pricing for energy on a grid; and schedule a quantity of energy to import to the grid or export from the grid based at least in part on the forecasted quantity of renewable power, the forecasted energy demand, and the real-time pricing for energy on the grid.

Clause 2. The system of clause 1, wherein the at least one computing device is configured to at least determine at least one weather forecast for at least one local area corresponding to at least one of the plurality of renewable energy generation sources, wherein the forecasted quantity of renewable power is based at least in part on the at least one weather forecast.

Clause 3. The system of any of clauses 1 or 2, wherein the at least one computing device is configured to at least determine at least one weather forecast for at least one local area corresponding to the at least one building, wherein the forecasted energy demand is based at least in part on the at least one weather forecast.

Clause 4. The system of any of clauses 1-3, further comprising a battery management service, a grid management service, a building energy usage service, and a power generation service in communication with one another via a communication bus.

Clause 5. The system of any of clauses 1-4, wherein the at least one computing device is further configured to at least: obtain a state of charge for a battery energy storage system; and obtain a state of health for the battery energy storage system, wherein the quantity of energy scheduled to import to the grid or export from the grid is further based at least in part on the state of charge and the state of health.

Clause 6. The system of any of clauses 1-5, wherein the at least one building comprises a plurality of buildings and the battery energy storage system comprises a plurality of battery energy storages, each of the plurality of battery energy storages being at a different one of the plurality of buildings.

Clause 7. The system of any of clauses 1-5, wherein the at least one computing device is further configured to at least optimize a scheduling of charging and discharging for the battery energy storage system based at least in part on the forecasted quantity of renewable power, the forecasted energy demand, and the real-time pricing for energy on the grid.

Clause 8. The system of any of clauses 1-7, wherein the at least one computing device is further configured to at least predict an occupancy of the at least one building, wherein the forecasted energy demand for the at least one building is based at least in part on the occupancy of the at least one building.

Clause 9. The system of any of clauses 1-8, wherein the energy demand is forecasted using sample average approximation stochastic programming.

Clause 10. The system of any of clauses 1-9, wherein the energy demand is forecasted based at least in part on a reduced order thermal resistance and capacitance network model.

Clause 11. A method comprising: forecasting, via at least one computing device, a quantity of renewable power from a plurality of renewable energy generation sources; forecasting, via the at least one computing device, an energy demand for at least one building; determining, via the at least one computing device, pricing for energy on a grid; and scheduling, via the at least one computing device, a quantity of energy to import to the grid or export from the grid based at least in part on the forecasted quantity of renewable power, the forecasted energy demand, and the real-time pricing for energy on the grid.

Clause 12. The method of clause 11, further comprising determining, via the at least one computing device, at least one weather forecast for at least one local area corresponding to at least one of the plurality of renewable energy generation sources, wherein the forecasted quantity of renewable power is based at least in part on the at least one weather forecast.

Clause 13. The method of any of clauses 11 or 12, further comprising determining, via the at least one computing device, at least one weather forecast for at least one local area corresponding to the at least one building, wherein the forecasted energy demand is based at least in part on the at least one weather forecast.

Clause 14. The method of any of clauses 11-13, wherein the pricing for energy on the grid comprises a dynamic real-time pricing.

Clause 15. The method of any of clauses 11-14, further comprising coupling, via a communication bus, a battery management service, a grid management service, a building energy usage service, and a power generation service in communication with one another.

Clause 16. The method of any of clauses 11-15, further comprising obtaining, via the at least one computing device, a state of health for the battery energy storage system based at least in part on a chemical composition of an anode, a cathode, and an electrolyte, wherein the quantity of energy scheduled to import to the grid or export from the grid is further based at least in part on the state of charge and the state of health.

Clause 17. The method of clause 16, further comprising optimizing, via the at least one computing device, a scheduling of charging and discharging for the battery energy storage system based at least in part on the forecasted quantity of renewable power, the forecasted energy demand, and the real-time pricing for energy on the grid.

Clause 18. The method of any of clauses 11-17, further comprising predicting, via the at least one computing device, an occupancy of the at least one building, the forecasted energy demand for the at least one building being based at least in part on the occupancy of the at least one building.

Clause 19. The method of any of clauses 11-18, wherein the energy demand is forecasted using sample average approximation stochastic programming.

Clause 20. The method of any of clauses 11-19, wherein the energy demand is forecasted based at least in part on a reduced order thermal resistance and capacitance network model.

Clause 21. The method of any of clauses 11-20, further comprising determining, via the at least one computing device, current and future operations of a building heating, a building ventilation, and a building air-conditioning system; determining, via the at least one computing device, current and future operations of controllable building lighting system; and determining, via the at least one computing device, current and future operations of controllable plug loads in buildings, wherein the quantity of energy to import to the grid or export from the grid is further based at least in part on the current and future operations of the building heating, the building ventilation, and the building air-conditioning system, the current and future operations of the controllable building lighting system, and the current and future operations of the controllable plug loads in buildings.

Clause 22. The system of any of clauses 1-10, wherein the at least one computing device is further configured to at least determine current and future operations of a building heating, a building ventilation, and a building air-conditioning system; determine current and future operations of controllable building lighting system; and determine current and future operations of controllable plug loads in buildings, wherein the quantity of energy to import to the grid or export from the grid is further based at least in part on the current and future operations of the building heating, the building ventilation, and the building air-conditioning system, the current and future operations of the controllable building lighting system, and the current and future operations of the controllable plug loads in buildings.

Therefore, at least the following is claimed:

1. A system comprising:
    a data store; and
    at least one computing device in communication with the data store, the at least one computing device configured to at least:
        forecast a quantity of renewable power from a plurality of renewable energy generation sources of at least one building;
        forecast, using sample average approximation stochastic programming, an energy demand for the at least one building using a reduced order thermal resistance and capacitance network model comprising: a zone thermal capacitance for at least one interior zone, at least one aggregated thermal resistance of the at least one building, and a wall structure thermal capacitance of an exterior wall structure of the at least one building;
        determine real-time pricing for energy on a grid; and
        schedule a quantity of energy to import to the grid or export from the grid based at least in part on the forecasted quantity of renewable power, the forecasted energy demand, and the real-time pricing for energy on the grid.

2. The system of claim 1, wherein the at least one computing device is configured to at least determine at least one weather forecast for at least one local area corresponding to at least one of the plurality of renewable energy generation sources, wherein the forecasted quantity of renewable power is based at least in part on the at least one weather forecast.

3. The system of claim 1, wherein the at least one computing device is configured to at least determine at least one weather forecast for at least one local area corresponding to the at least one building, wherein the forecasted energy demand is based at least in part on the at least one weather forecast.

4. The system of claim 1, further comprising a battery management service, a grid management service, a building energy usage service, and a power generation service in communication with one another via a communication bus.

5. The system of claim 1, wherein the at least one computing device is further configured to at least:
    obtain a state of charge for a battery energy storage system; and
    obtain a state of health for the battery energy storage system, wherein the quantity of energy scheduled to import to the grid or export from the grid is further based at least in part on the state of charge and the state of health.

6. The system of claim 5, wherein the at least one building comprises a plurality of buildings and the battery energy storage system comprises a plurality of battery energy storages, each of the plurality of battery energy storages being at a different one of the plurality of buildings.

7. The system of claim 5, wherein the at least one computing device is further configured to at least optimize a scheduling of charging and discharging for the battery energy storage system based at least in part on the forecasted quantity of renewable power, the forecasted energy demand, and the real-time pricing for energy on the grid.

8. The system of claim 1, wherein the at least one computing device is further configured to at least predict an occupancy of the at least one building.

9. The system of claim 8, wherein the forecasted energy demand for the at least one building is based at least in part on the occupancy of the at least one building.

10. The system of claim 1, wherein the real-time pricing for energy on the grid comprises a dynamic real-time pricing.

11. A method comprising:
forecasting, via at least one computing device, a quantity of renewable power from a plurality of renewable energy generation sources of at least one building;
forecasting, using sample average approximation stochastic programming, via the at least one computing device, an energy demand for the at least one building using a reduced order thermal resistance and capacitance network model comprising a zone thermal capacitance for at least one interior zone, at least one aggregated thermal resistance of the at least one building, and a wall structure thermal capacitance of an exterior wall structure of the at least one building;
determining, via the at least one computing device, real-time pricing for energy on a grid; and
scheduling, via the at least one computing device, a quantity of energy to import to the grid or export from the grid based at least in part on the forecasted quantity of renewable power, the forecasted energy demand, and the real-time pricing for energy on the grid.

12. The method of claim 11, further comprising determining, via the at least one computing device, at least one weather forecast for at least one local area corresponding to at least one of the plurality of renewable energy generation sources, wherein the forecasted quantity of renewable power is based at least in part on the at least one weather forecast.

13. The method of claim 11, further comprising determining, via the at least one computing device, at least one weather forecast for at least one local area corresponding to the at least one building, wherein the forecasted energy demand is based at least in part on the at least one weather forecast.

14. The method of claim 11, wherein the real-time pricing for energy on the grid comprises a dynamic real-time pricing.

15. The method of claim 11, further comprising coupling, via a communication bus, a battery management service, a grid management service, a building energy usage service, and a power generation service in communication with one another.

16. The method of claim 11, further comprising obtaining, via the at least one computing device, a state of health for a battery energy storage system based at least in part on a chemical composition of an anode, a cathode, and an electrolyte, wherein the quantity of energy scheduled to import to the grid or export from the grid is further based at least in part on a state of charge and the state of health.

17. The method of claim 16, further comprising optimizing, via the at least one computing device, a scheduling of charging and discharging for the battery energy storage system based at least in part on the forecasted quantity of renewable power, the forecasted energy demand, and the real-time pricing for energy on the grid.

18. The method of claim 11, further comprising predicting, via the at least one computing device, an occupancy of the at least one building.

19. The method of claim 18, wherein the forecasted energy demand for the at least one building is based at least in part on the occupancy of the at least one building.

20. The method of claim 11, further comprising:
determining, via the at least one computing device, current and future operations of a building heating, a building ventilation, and a building air-conditioning system;
determining, via the at least one computing device, current and future operations of controllable building lighting system; and
determining, via the at least one computing device, current and future operations of controllable plug loads in buildings, wherein the quantity of energy to import to the grid or export from the grid is further based at least in part on the current and future operations of the building heating, the building ventilation, and the building air-conditioning system, the current and future operations of the controllable building lighting system, and the current and future operations of the controllable plug loads in buildings.

* * * * *